US012516888B2

(12) United States Patent
Freeman et al.

(10) Patent No.: US 12,516,888 B2
(45) Date of Patent: Jan. 6, 2026

(54) HEAT EXCHANGER CONFIGURATION FOR NUCLEAR REACTOR

(71) Applicant: TerraPower, LLC, Bellevue, WA (US)

(72) Inventors: Charles Gregory Freeman, Tampa, FL (US); Pavel Hejzlar, Kirkland, WA (US); Calen Kaneko, Seattle, WA (US); David M. Lucoff, Boise, ID (US); Christopher A. Martin, Seattle, WA (US); Daniel L. Pierce, Hampstead, NC (US); Thomas E. Riordan, Redmond, WA (US); Mark R. Werner, Bellevue, WA (US)

(73) Assignee: TERRAPOWER, LLC, Bellevue, WA (US)

( * ) Notice: Subject to any disclaimer, the term of this patent is extended or adjusted under 35 U.S.C. 154(b) by 192 days.

(21) Appl. No.: 17/227,266

(22) Filed: Apr. 9, 2021

(65) Prior Publication Data

US 2022/0051816 A1 Feb. 17, 2022

Related U.S. Application Data

(60) Provisional application No. 63/066,788, filed on Aug. 17, 2020.

(51) Int. Cl.
*F28D 9/00* (2006.01)
*F22B 1/06* (2006.01)
*F28F 9/00* (2006.01)

(52) U.S. Cl.
CPC ........... *F28D 9/0037* (2013.01); *F22B 1/066* (2013.01); *F28D 9/0093* (2013.01); *F28F 9/005* (2013.01);
(Continued)

(58) Field of Classification Search
CPC ........ F28D 9/0037; F28D 9/0093; F28D 7/10; F28D 7/103; F28D 7/106;
(Continued)

(56) References Cited

U.S. PATENT DOCUMENTS 2,658,728 A * 11/1953 Evans, Jr. ............. F28D 7/1607
165/104.31
4,109,710 A * 8/1978 Forster .................. F28D 9/0006
165/DIG. 399
(Continued)

FOREIGN PATENT DOCUMENTS

EP 3591327 A1 1/2020
FR 2583865 A1 * 10/1981
(Continued)

OTHER PUBLICATIONS

KR101734288B1 English Machine Translation (Year: 2017).*
(Continued)

*Primary Examiner* — Jenna M Maroney
(74) *Attorney, Agent, or Firm* — FisherBroyles, LLP; Jeremy P. Sanders

(57) ABSTRACT

A nuclear reactor includes a heat exchanger that transfers thermal energy from a primary reactor coolant to a secondary coolant. The heat exchanger is a compact plate heat exchanger and more than one heat exchanger may be spaced about the reactor vessel. A plurality of heat exchangers may be spaced vertically, radially, and/or circumferentially about the reactor vessel. A first heat exchanger may be in fluid communication with a second heat exchanger. Two or more heat exchangers may share a thermal load and therefore share thermal stresses. The heat exchanger may have a third fluid flow path and a third fluid. The third fluid may be used to remove fission products, be used for leak detection, create
(Continued)

an oxidation layer to inhibit migration of activation products, and/or provide additional heat transfer.

20 Claims, 14 Drawing Sheets

(52) U.S. Cl.
CPC ....... *F28F 2230/00* (2013.01); *F28F 2265/16* (2013.01)
(58) Field of Classification Search
CPC . F28D 2021/0054; G21C 15/02; G21C 15/28; G21C 15/002; G21C 17/002; F22B 1/066; F28F 1/003; F28F 2265/16
See application file for complete search history.

(56) References Cited

U.S. PATENT DOCUMENTS

| | | | | |
|---|---|---|---|---|
| 4,291,759 | A * | 9/1981 | Sumitomo | F28D 9/0006 165/146 |
| 5,383,516 | A * | 1/1995 | Dinulescu | F28D 9/0062 165/82 |
| 6,089,313 | A * | 7/2000 | Levy | F28F 9/0075 165/145 |
| 10,811,152 | B2 | 10/2020 | Kim et al. | |
| 2008/0179049 | A1* | 7/2008 | Mathur | F28F 9/005 165/167 |
| 2009/0050295 | A1* | 2/2009 | Francois | F28D 9/0006 165/104.14 |
| 2011/0011570 | A1 | 1/2011 | Levings et al. | |
| 2013/0089174 | A1* | 4/2013 | Diamond | G21C 13/04 376/366 |
| 2016/0109189 | A1 | 4/2016 | Davies et al. | |
| 2017/0297975 | A1* | 10/2017 | Radaelli | F22B 9/00 |
| 2017/0309354 | A1* | 10/2017 | Kim | G21D 1/006 |
| 2018/0137944 | A1* | 5/2018 | Abbott | G21C 15/26 |
| 2019/0103195 | A1* | 4/2019 | Harkness | G21C 1/03 |

FOREIGN PATENT DOCUMENTS

| | | | | |
|---|---|---|---|---|
| GB | 1572315 | A * | 7/1980 | ............ F28D 7/10 |
| KR | 20130046235 | A * | 5/2013 | |
| KR | 101565436 | B1 | 11/2015 | |
| KR | 20160129557 | A | 11/2016 | |
| KR | 101734288 | B1 * | 5/2017 | |

OTHER PUBLICATIONS

FR-2583865-A1 English Translation (Year: 1981).*
Yoon et al., "Analytical Study on Thermal and Mechanical Design of Printed Circuit Heat Exchanger", Idaho National Laboratory, Sep. 2013, 56 pages, http://www.inl.gov.
Zawati et al., "Thermal Analysis and Pressure Loss Modeling for an Optimized Heat Exchanger Used in a Recuperated CO2 Power Cycle", Proceedings of ASME Turbo Expo 2018, Turbomachinery Technical Conference and Exposition GT2018, Jun. 11-15, 2018, 11 pages.
Aakre, Shaun, High-Temperature PCHE Performance test facilities, University of Wisconsin, Madison presentation at the Integrated Research Project Meeting, Alexandria VA, Oct. 24, 2019.
Allen, Todd, Advancements Toward ASME Nuclear Code Case for Compact Heat Exchangers, University of Michigan, Aug. 5, 2019.
Baldi, Giovanni, Flow distribution optimisation of ASTRID power plant's sodium-gas heat exchanger, Tesi di Laurea Magistrale in Energy Engineering, Politecnico di Milano, Apr. 2018.
Bowdery, Tony, LNG Applications of Diffusion Bonded Heat Exchangers, AIChE Spring Meeting, Apr. 2006, 6th Topical Conference on Natural Gas Utilization, Orlando Apr. 23-27, 2006.
Cachon et al., Status of the Sodium Gas Heat Exchanger (SGHE) development for the Nitrogen Power Conversion System planned for the ASTRID SFR prototype. ICAPP 2015—International Congress on Advances on nuclear Power Plants, May 2015, Nice, France. paper 15362.
Chen Design Fabrication Testing and Modeling of a High-Temperature Printed Circuit Heat Exchanger, Thesis Graduate Program in Nuclear Engineering, Ohio State University 2015.
Chen et al., Fabrication and Testing of a High-Temperature Printed Circuit Heat Exchanger, NURETH—16, Chicago, IL, Aug. 30-Sep. 4, 2015.
Chen, Minghui, Performance Testing and Modeling of Printed Circuit Heat Exchangers for Advanced Nuclear Reactor Applications, thesis University of Michigan, 2018.
Clean Energy Systems Inc, Novel Low-Cost Heat Exchanger for High Temperature Molten Salts; Phase I; Final Scientific/Technical Report, CES Report No. RPT-223-000003; Rev. 0; Jun. 14, 2019.
Daouk, Amr, Performance Analysis and Modeling of a Printed Circuit Heat Exchanger with Air and Carbon Dioxide as Working Fluids, Thesis, Master of Applied Science in Mechanical Engineering, Carleton University, Ottawa, Ontario, Canada, Sep. 2016.
Dewson, Stephen John, Printed Circuit Heat Exchangers for Supercritical CO2 Cycles, MIT Symposium on Supercritical CO2 cycle, Mar. 6, 2007.
Hayashi, Masaaki, Explanation of FBR Monju Intermediate Heat Exchanger (IHX) Design, Hitachi—GE presentation dated Jun. 29, 2010.
Ishizuka et al., Thermal-Hydraulic Characteristics of a Printed Circuit Heat Exchanger in a Supercritical CO2 Loop, The 11th International Topical Meeting on Nuclear Reactor Thermal-Hydraulics (NURETH—11) Paper: 218, Popes' Palace Conference Center, Avignon, France, Oct. 2-6, 2005.
Jentz et al., Failure Mod Effects Analysis for Section III, Division 5 Class A, High Temperature Service of a Printed Circuit Heat Exchanger, Proceedings of the ASME 2020, Pressure Vessels & Piping Conference, PVP2020, Jul. 19-24, 2020, Minneapolis, Minnesota, USA.
Kar, Satya Prakash, CFD Analysis of Printed Circuit Heat Exchanger, Thesis, Department of Mechanical Engineering, National Institute of Technology, Rourkela, 2007.
Ke, et al., Analysis Exploring the Uniformity of Flow Distribution in Multi-Channels for the Application of Printed Circuit Heat Exchangers, Symmetry 2020, 12, 314.
Kim et al., Thermal-hydraulic physical models for a Printed Circuit Heat Exchanger covering He, He—CO2 mixture, and water fluids using experimental data and CFD, Experimental Thermal and Fluid Science 48 (2013) 213-221.
Le Pierres et al., Impact of Mechanical Design Issues on Printed Circuit Heat Exchangers, Proceedings of SCO2 Power Cycle Symposium 2011, University of Colorado at Boulder—University Memorial Center, CO, May 24-25, 2011.
Li et al., Heat Exchangers for the Next Generation of Nuclear Reactors, Proceedings of ICAPP '06, Reno, NV USA, Jun. 4-8, 2006, Paper 6105.
Li et al., Materials for Nuclear Diffusion-Bonded Compact Heat Exchangers, Proceedings of ICAPP '09, Tokyo, Japan, May 10-14, 2009, Paper 9058.
Mochizuki, Hiroyasu, Liquid Metal Heat Transfer Under Low Peclet Number Conditions, Research Institute of Nuclear Engineering, University of Fukui, NURETH 16, Chicago, IL, Aug. 30-Sep. 4, 2015.
Mohagheghi et al., Use of 1-D Finite Enthalpy Method for a High-Temperature Recuperator Made of Polymer Derived Ceramic Composite for a Supercritical Carbon Dioxide Power System, The 5th International Symposium—Supercritical CO2 Power Cycles, Mar. 28-31, 2016, San Antonio, Texas.
Moisseytsev et al., Comparison of Heat Exchanger Modeling with Data from CO2-to-CO2 Printed Circuit Heat Exchanger Performance Tests, Proceedings of ICAPP '10 San Diego, CA, USA, Jun. 13-17, 2010 Paper 10123.
Nestell et al., ASME Code Considerations for the Compact Heat Exchanger, ORNL/TM-2015/401, Aug. 31, 2015.
Nikitin et al., Thermal-Hydraulic Performance of Printed Circuit Heat Exchanger in Supercritical CO2 Cycle, Tokyo Institute of Technology, Jan. 5, 2005.

(56) References Cited

OTHER PUBLICATIONS

Penfield, Scott R. Jr., Compact Heat Exchangers for Nuclear Power Plants, Topical Workshop on New Cross-cutting Technologies for Nuclear Power Plants, Session 2: Advanced Power Conversion for NPP, MIT Jan. 30, 2017.

Plancq et al., Progress in the astrid sodium gas heat exchanger development. International Conference on Fast Reactors and Related Fuel Cycles Next Generation Nuclear Systems for Sustainable Development (FR17), Jun. 2017, Yekaterinburg, Russia.

Pua et al., Industrial Microchannel Devices—Where are we Today? First International Conference on Microchannels and Minichannels, Apr. 24-25, 2003, Rochester, New York, USA, ICMM2003-1101.

Selby et al., Non-Destructive Examination of Diffusion-Bonded Compact Heat Exchangers, Proceedings of the ASME 2020, Pressure Vessels & Piping Conference, PVP2020, Jul. 19-24, 2020, Minneapolis, Minnesota, USA.

Seo et al., Heat Transfer and Pressure Drop Characteristics in Straight Microchannel of Printed Circuit Heat Exchangers, Entropy 2015, 17, 3438-3457; doi 10.3390/e17053438, May 18, 2015.

Sham et al., A Design Based Approach To Material Selection For Advanced High Temperature Reactor Components, Proceedings of the ASME 2017 Pressure Vessels and Piping Conference, PVP2017, Jul. 16-20, 2017, Waikoloa, Hawaii, USA.

Shiferaw et al., Diffusion bonded heat exchangers (PCHEs) in Fuel Gas Heating to Improve efficiency of CCGTs, Proceedings of the ASME 2014 Power Conference, ASME 2014, Jul. 28-31, 2014, Baltimore, Maryland, USA.

Shiferaw et al., Economic analysis of SCO2 cycles with PCHE Recuperator design optimisation, The 5th International Symposium—Supercritical CO2 Power Cycles Mar. 28-31, 2016, San Antonio, Texas.

Shirvan et al., Safety Analysis of a Compact Vessel Integrated LWR, MIT, Jun. 17, 2010.

Sienicki et al., Initial Argonne Sodium Draining Tests: Analysis of Test Results and Comparison with Water Draining Behavior, ANL-ART-129, May 21, 2018.

Southall et al., Innovative Compact Heat Exchangers, Proceedings of ICAPP '10 San Diego, CA, USA, Jun. 13-17, 2010, Paper 10300.

Southall et al., Design Considerations for Compact Heat Exchangers, Proceedings of ICAPP '08, Anaheim, CA USA, Jun. 8-12, 2008, Paper 8009.

Southall, David, Diffusion Bonding in Compact Heat Exchangers, Proceedings of ICAPP 09, Tokyo, Japan, May 10-14, 2009, Paper 9069.

Sun et al., Compact Heat Exchanger Design and Testing for Advanced Reactors and Advanced Power Cycles, Final Report UM/THL-18-06 for US DOE DE-NE0000706, Mar. 31, 2018.

SWG High Temperature Reactor Stakeholders, ASME Code Case for Compact Heat Exchanger, Draft Code Case and Gap Analysis, Aug. 2019 Code Week.

Vitillo et al., Experimental and numerical activities in support of the design of astrid sodium-gas heat exchanger, NURETH 16—16th International Topical Meeting on Nuclear Reactor Thermal Hydraulics, Aug. 2015, Chicago, USA.

PCT/US2021/026733 International Search Report and Written Opinion dated Sep. 29, 2021, 19 pages.

\* cited by examiner

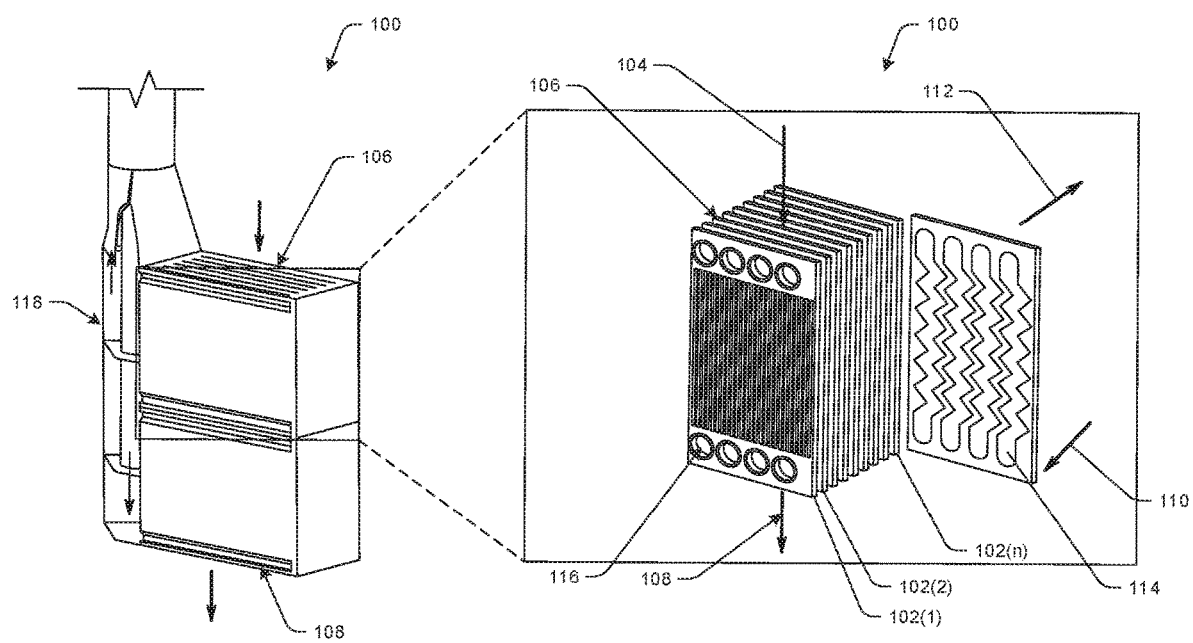

HEAT EXCHANGER CONFIGURATION FOR NUCLEAR REACTOR

CROSS-REFERENCE TO RELATED APPLICATIONS

This application claims the benefit under 35 U.S.C. § 119(e) of U.S. Provisional Patent Application No. 63/066,788, filed Aug. 17, 2020, entitled "HEAT EXCHANGER CONFIGURATION FOR NUCLEAR REACTOR," the contents of which is incorporated herein by reference in its entirety.

BACKGROUND

A heat exchanger is a device that allows thermal energy transfer from a reactor core of an operating nuclear reactor to a secondary fluid where the thermal energy is taken and used for a useful purpose. In some cases, the thermal energy is used for steam generation, which is used for power generation, such as through a steam turbine.

In many cases, heat exchangers are quite large and occupy a substantial space within the reactor vessel of a nuclear reactor. In many cases, the heat exchanger is a major design factor in designing the nuclear reactor and, in large part, determines the overall height of the reactor vessel, which in turn, affects the overall size of the containment structure and other components.

Furthermore, a large heat exchanger may necessarily have part of its flow path near the reactor core, where it receives a relatively high neutronic activity. Shielding the heat exchanger and its flow paths increases cost, complexity, and the number of components necessary to install within the reactor vessel.

The problem is exacerbated depending on the fluids circulating within the heat exchanger. For instance, in a sodium-cooled fast reactor, the primary coolant is sodium, and the secondary fluid that receives thermal energy from the primary coolant may also be sodium. The choice of sodium as a secondary coolant drives many of the design decisions for the heat exchanger because of its thermal conductivity. In a reactor using a secondary coolant having a lower thermal conductivity, the heat exchanger may be required to be larger. For example, in a nuclear reactor using sodium as a primary coolant and a molten salt as a secondary coolant, the heat exchanger will necessarily be substantially larger than a sodium/sodium heat exchanger. This is, in large part, because molten coolant salt has on the order of 100× lower thermal conductivity than sodium. Consequently, in some cases, a sodium/salt heat exchanger is over twice the height of a sodium/sodium heat exchanger to provide a similar thermal energy transfer.

Historically, the available coolants for primary heat exchangers may be limited by the required size of the resulting heat exchanger. Moreover, the size of typical heat exchangers, at least in part, drives the height of the reactor vessel. It would be a significant advantage in the art to have more flexibility in choosing primary and secondary coolants, as well as options for locating one or more heat exchangers within the reactor vessel, while reducing the overall size of the reactor vessel in the process. These, and other advantages, will become apparent by reference to the following description and appended figures.

SUMMARY

According to some embodiments, a plate heat exchanger for a nuclear reactor includes a plurality of plates; a first fluid inlet and a first fluid outlet and a first fluid pathway communicating therebetween, the first fluid pathway formed as guide channels in the plurality of plates; and a second fluid inlet and a second fluid outlet and a second fluid pathway communicating therebetween, the second fluid pathway formed as second guide channels in the plurality of plates, the second fluid pathway fluidically separated from the first fluid pathway.

In some examples, the plate heat exchanger further includes a third fluid inlet and a third fluid outlet and a third fluid pathway communicating therebetween, the third fluid pathway fluidically separated from the first fluid pathway and the second fluid pathway. The third fluid pathway may be configured for a purpose other than thermal energy transfer For example, the third fluid pathway may be configured to receive a third fluid, different from a first fluid and a second fluid, and may be used for leak detection of the first fluid, the second fluid, or both. Optionally, the third fluid may be used to create an oxidation layer within the third fluid pathway. In some cases, the third fluid may be used to capture fission products or activation products, such as tritium, for example.

According to some examples, the first fluid inlet and the first fluid outlet are formed on a same side of the plate heat exchanger. In some cases, a coaxial conduit is coupled to the first fluid inlet and the first fluid outlet, the coaxial conduit defining an inner fluid conduit and an outer fluid conduit, the inner fluid conduit fluidically coupled to one of the first fluid inlet and the first fluid outlet and the outer fluid conduit fluidically coupled to the other of the first fluid inlet and the first fluid outlet.

The third fluid may be hydrogen, helium, CO2, or a combination.

In some embodiments, a first fluid is in the first fluid pathway and a second fluid is in the second fluid pathway. The first and second fluid may be different fluids, and in some cases may be the same fluids. The first fluid may be sodium and, in some cases—the second fluid may be a molten salt.

In some instances, the plate heat exchanger is a first plate heat exchanger and a second plate heat exchanger may be fluidically coupled to the first plate heat exchanger. For example, an array of heat exchangers may be provided where two or more heat exchangers are fluidically coupled together, such as two, three, four, six, eight, or more heat exchangers.

In some cases, the first fluid outlet of the first plate heat exchanger is in fluid communication with a first fluid inlet of the second plate heat exchanger. A plurality of heat exchangers may be configured to cooperate to handle a heat load of a nuclear reactor.

In some examples, at least some of the plurality of heat exchangers are in fluid communication by a fluid header. In other words, a fluid header may deliver fluid to some of the plurality of heat exchangers from a common source.

In some cases, at least some of the plurality of heat exchangers are plumbed in series. In some cases, at least some of the plurality of heat exchangers are plumbed in parallel. For example, some of the heat exchangers may be plumbed in series and others o the heat exchangers may be plumbed in parallel. In some cases, a first group of heat exchangers may be plumbed in series while another group of heat exchangers may be plumbed in parallel, and in some cases, the two groups are plumbed in fluid communication with each other.

According to some embodiments, a method for removing a fission product or activation product from a reactor coolant within a heat exchanger of a nuclear reactor, comprising the steps of: locating a plate heat exchanger within a reactor vessel; passing a primary coolant through a first fluid pathway of the plate heat exchanger; passing a secondary coolant through a second fluid pathway of the plate heat exchanger; passing a third fluid through a third fluid pathway of the plate heat exchanger, the third fluid selected to attract the fission product or activation product; and removing the fission product or activation product from the plate heat exchanger with the third fluid.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1A is a schematic representation of a plate heat exchanger for transferring thermal energy from a hot fluid to a cold fluid, in accordance with some embodiments;

FIG. 1B is a schematic representation of a plate heat exchanger with a coaxial inlet and outlet, in accordance with some embodiments;

DETAILED DESCRIPTION

Figures 2A, 2B:
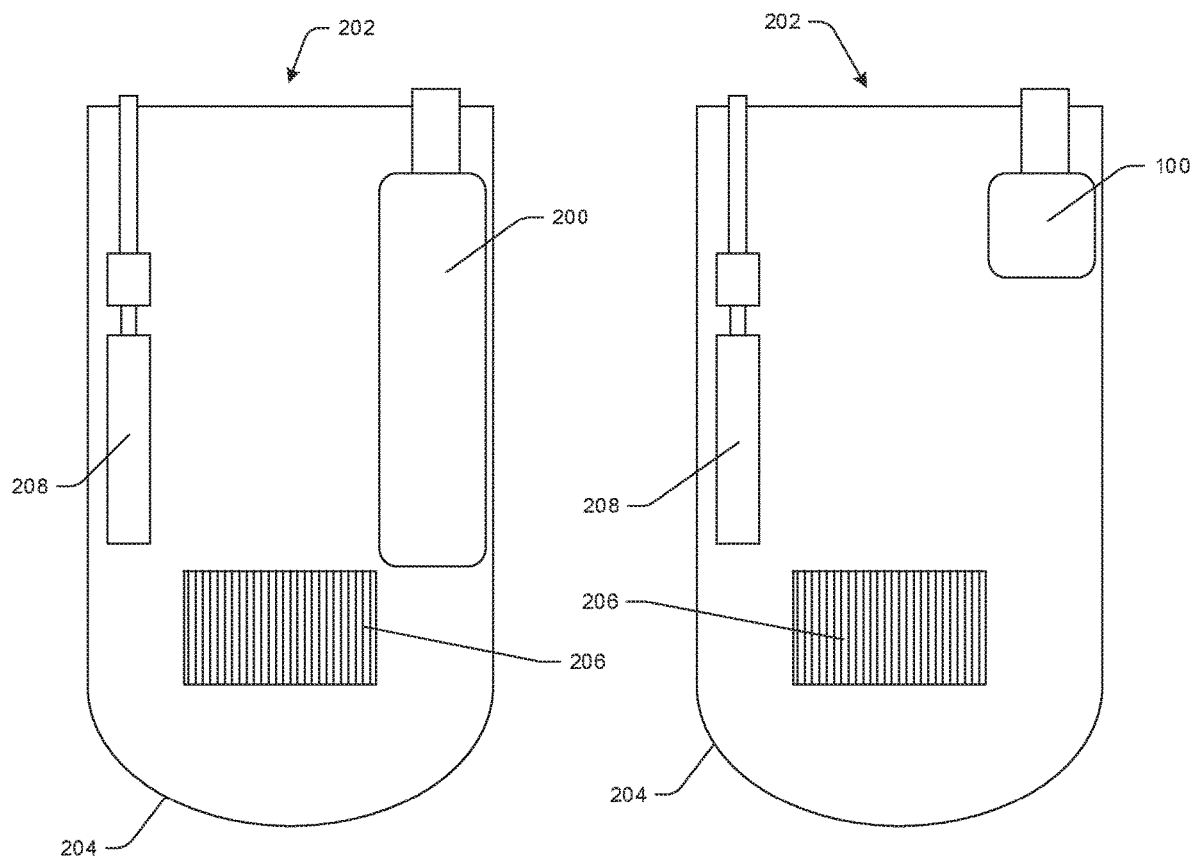
FIG. 2a illustrates a schematic representation of a sodium cooled fast reactor with a shell and tube heat exchanger, in accordance with some embodiments.
FIG. 2B illustrates a schematic representation of a sodium cooled fast reactor with a plate heat exchanger, in accordance with some embodiments.

This disclosure generally relates to heat exchanger apparatuses for nuclear reactors. It also relates to an arrangement and location of multiple heat exchangers throughout the reactor vessel. In some cases, the heat exchangers allow flexibility in the placement, orientation, and number of heat exchangers used. Furthermore, a wider variety of secondary coolants may be used with the described heat exchangers, and in some cases, a third fluid pathway may be provided through one or more heat exchangers.

In some embodiments a compact heat exchanger is provided within a reactor vessel of a nuclear reactor and transfers heat from a primary coolant in the reactor core to a secondary coolant. In some cases, the heat exchanger transfers thermal energy from sodium to salt. For example, in a sodium-cooled fast reactor ("SFR"), sodium may be used as the primary coolant within the reactor vessel. As the sodium circulates throughout the reactor vessel either through natural circulation, one or more circulation pumps, or a combination of circulation modalities, the sodium in closer proximity to a region of high reactivity will receive thermal energy and become heated. The heated sodium may be caused to flow through a heat exchanger, where the thermal energy is transferred from the primary sodium coolant to a secondary coolant, which in some cases is sodium, salt, or some other secondary coolant.

A plate heat exchanger may be used to transfer thermal energy from the primary coolant (e.g., sodium) to the secondary coolant, which in some cases may be a molten salt. In some cases, a plate heat exchanger may have two inlets and two outlets. For example, a plate heat exchanger may have an inlet and an outlet for the sodium and an inlet and outlet for the salt. The flow paths for these liquids may be defined by channels within respective plates of the heat exchanger and the plates keep the liquids separated, and in thermal communication as the plates conduct thermal energy from the hot fluid to the cold fluid.

In some cases, a third inlet and outlet may be provided, and a third fluid flow path is defined by one or more plates in the heat exchanger. A third fluid may be provided for any of a number of purposes, for example, for additional heat transfer, to detect leaks in the heat exchanger of either the hot fluid or the cold fluid, for removing fission products or activation products (e.g., tritium), or some other purpose. In some cases, hydrogen may be used as a third fluid within the heat exchanger. In some cases, $CO_2$ may be used as a third fluid within the heat exchanger. In some cases, helium may be used as the third fluid within the heat exchangers.

In any case, the third fluid may be used for leak detection. For example, one or more detectors may be placed on the third fluid stream that is downstream of the heat exchanger and the third fluid may be tested for the inclusion of one or more substances that were not present in the third fluid before it entered the heat exchanger. For example, the third fluid can be tested for salt after it passes through the heat exchanger, and the presence of salt in the third fluid (whether in liquid or vapor form) is an indication of a salt leak within the heat exchanger.

A third fluid within the heat exchanger may additionally or alternatively be used to attract fission and activation products. For example, a third fluid (e.g., helium, hydrogen, and others) may be used as the third fluid to mitigate tritium.

The third fluid may be selected and/or configured so that fission products or activation products have a higher affinity for the third fluid rather than a coolant salt. In this way, the coolant fluid, such as salt, acquires a reduced amount of tritium than without the third fluid present in the heat exchanger.

In some cases, the third fluid in the heat exchanger may be used to form an oxidation layer within the heat exchanger. As discussed below, an oxidation layer has been shown to reduce the penetration of tritium. In a sodium/salt heat exchanger, as an example, the sodium flow path will not likely have a significant oxidation layer within the flow path, the salt flow path may form a measurable oxidation layer, which will reduce tritium penetration to some degree. By introducing a third fluid configured to cause an oxidation layer, the tritium penetration may be dramatically affected and reduce compared with no oxidation layer.

For example, a third fluid, such as $CO_2$, for example, may be passed through a third fluid pathway through the heat exchanger to purposefully form an oxidation layer on the surfaces within the heat exchanger. The third fluid may additionally be used for other purposes, such as leak detection, as described herein. In some cases, a third fluid, such as $CO_2$, may be passed through the third fluid pathway, and then a fourth fluid may be passed through the third fluid pathway. For example, $CO_2$ may flow through the third fluid pathway, and then at another time, helium may be passed through the third fluid pathway. In this way, the third fluid pathway may be used for multiple purposes, such as, without limitation, forming an oxidation layer, capturing fission products or activation products, providing additional heat transfer, used for leak detection, or some other purpose. One such activation product that may be captured within the heat exchanger is tritium.

Tritium is produced in all nuclear reactors by nuclear reactions in the core (fuel and other core components) and in the moderator/coolant. Tritium atoms are very mobile and can diffuse through cladding and other metallic barriers and may be released to the environment unless "trapped" and disposed of as regulated radioactive waste. Tritium production in LWRs (Light Water Reactors) and SFRs are similar; however, the release fraction (tritium released/tritium produced) is distinctly different for the two reactor types. Significantly more tritium is released into the environment from LWRs than SFRs.

In some cases, a sodium system cold trap is used to control tritium release to the environment. The cold traps may be operated at low inlet temperature (e.g., about 115° C.) for cold trap efficiency, which in some cases may be around 70%. Sodium Cooled Fast Reactors, with or without steam generators, may typically produce enough $^1H$ by the (n,p) reaction in primary sodium to maintain a high trapping efficiency in the primary and secondary cold traps and keep tritium releases to the environment below regulatory limits.

Oxidation on metal surfaces of the sodium system piping and components may reduce the tritium diffusion rate by a factor of up to about 88 through the metal barrier. In some cases, metal surfaces in contact with liquid sodium will have almost no oxide coating because sodium scavenges oxygen, so, typically only surfaces exposed to the air will develop an oxide coating.

For SFRs using a mixed oxide fuel (MOX) or ternary alloy metal fuel, tritium generation by ternary fission production is on the order of 16.9 mCi/MWD. In some cases, in which a TWR uses binary alloy metal fuel, the ternary fission production rate of tritium is about 13.6 mCi/MWD because the tritium yield for U-235 is 76% of the yield value for Pu-239.

Tritium is highly mobile, and it diffuses through most metallic barriers. Accordingly, in many cases, some tritium will be released from the reactor core into the general environment during normal plant operations. Tritium is also a radioisotope of concern in evaluating the radiological source term associated with an accident. Tritium is produced in the reactor core by ternary fission in the fuel and neutron capture in boron (B) in control rods and the radial shield.

A tritium atom produced in fuel or B4C absorber typically diffuses through pin cladding into primary sodium where it chemically reacts with sodium to form $Na^3H$ (sodium tritide). In many cases, much of the $Na^3H$ may be trapped in a primary cold trap before it can diffuse through the walls of the primary sodium loop into one of the inert cells. Some tritium may also tend to diffuse through the Iheat exchanger (Intermediate Heat Exchanger) piping into one of three secondary loops, where it may react with sodium to form $Na^3H$, which may be trapped in a secondary col trap.

The tritium not captured in a "secondary cold trap" may diffuse through the walls of the secondary sodium loop piping into pipe-ways outside the containment structure, and, along with tritium that diffuses through the "tube walls" of the dump heat exchangers (Dheat exchangers), may be ventilated to the external environment.

Tritium is a small atom, and therefore, it is expected to diffuse through most metallic barriers. However, if the metallic surface has an oxide coating, the tritium diffusion rate is significantly reduced by about a factor of 88. This effect is an important inhibitor of the release rate of $^3H$ to the environment.

In some embodiments, release of tritium to the environment may be controlled by sodium system cold trap performance. For sodium cooled LMRs, impurities in the sodium coolant are maintained below a specified concentration to protect cladding integrity. Impurity concentration is monitored by the PTI (Plugging Temperature Indicator), a device that measures the sodium flow pressure drop ($\Delta P$) across an orifice plate. An increase in $\Delta P$ indicates sodium impurities (oxides and hydrides) are beginning to precipitate because their concentrations in the sodium coolant have increased above the acceptable range. The sodium processing system cold traps maintain the impurity level below the concentration required by the technical specifications.

In some instances, a cold trap in the primary sodium processing system may be used to remove a majority of the tritium fission product; however, it is possible that some tritium may transfer to a coolant salt such as through a sodium to salt heat exchanger. In some cases, one or more cold traps in the salt loop can be used to remove tritium from the coolant salt loop, thereby reducing the amount of tritium within the salt loop. However, tritium may be removed within the heat exchanger itself, such as by passing a fluid through the heat exchanger that may trap tritium as it passes through the heat exchanger to be trapped downstream.

FIGS. 1A and 1B illustrate a compact heat exchanger 100 that may be formed as a plate heat exchanger, in which two or more fluids are separated from one another by any of a suitable number plates 102(1) 102(2), 102(n). The plates may have fluid flow channels formed therein, which may be machined, chemically etched, laser etched, or formed through some other suitable process. The plates may provide thermal communication between the two or more fluids, such as through material conduction. In some cases, the plates may be fused together to form a monolithic structure.

As illustrated, a primary reactor coolant 104, which may be sodium, enters the heat exchanger from a top inlet 106, where it flows through the channels in the plates, and exits an opposing side of the heat exchanger at an outlet 108. A second inlet 110 for a secondary coolant fluid, which may be salt, can be provided at one or more locations of the heat exchanger 100. A secondary coolant fluid outlet 112 allows the secondary coolant to exit the heat exchanger 100. In some cases, the secondary coolant loop includes a coaxial pipe in which an inner pipe extends through an outer pipe. The inner pipe may be coupled to the inlet of the heat exchanger and the outer pipe may be coupled to an outlet of the heat exchanger.

In this configuration, the salt inlet and outlet may be formed on the same side of the heat exchanger.

In some cases, the outlet 108 of a first heat exchanger 100(1) provides an input to a second heat exchanger 100(2). In some cases, two or more heat exchangers may be fluidically coupled directly to one another to allow a fluid outlet of the first heat exchanger to provide a fluid inlet to the second heat exchanger. This arrangement may reduce thermal stresses applied on the heat exchanger and allow a greater efficiency, while allowing smaller heat exchangers to be utilized within the reactor vessel.

For example, where there is a desired temperature differential $\Delta T$ between in the inlet and outlet of the heat exchanger, providing a single heat exchanger to transfer the thermal energy results in thermal stresses on the heat exchanger. By utilizing two or more heat exchangers to effect the same $\Delta T$, each heat exchanger can be responsible for a thermal transfer that is less than the full desired $\Delta T$. In this way, the two or more heat exchangers each experience thermal stresses that are less than a single heat exchanger that is responsible for the full $\Delta T$.

In some embodiments, the two or more heat exchangers, while fluidically coupled together, are not structurally coupled together, such that the two or more heat exchangers are each free to distort and expand/contract independently of one another. In other words, the two or more heat exchangers handle thermal stresses independently. The result is a robust heat transfer system that is able to manage heat transfer while reducing overall thermal stresses on the heat exchangers by spreading the thermal stress over multiple heat exchangers. While there may be an increase in flow resistance and a pressure drop, these losses may be mitigated by the design of the heat exchangers, the flow path therethrough, and the increased longevity in the heat transfer system.

Further, the smaller size of the heat exchanger provides more opportunities for locating the heat exchanger in suitable places within the reactor vessel. For example, by utilizing multiple heat exchangers, they may be spaced radially, vertically, circumferentially, or a combination throughout the reactor vessel.

Suitable heat exchangers 100 include, without limitation, a printed circuit heat exchanger, a plate heat exchanger, a formed plate heat exchanger, or a hybrid heat exchanger, in which two or more media flow on opposite sides of one or more bonded plates. The cooling media may be under high pressure, but in some embodiments, is at low pressure. The working fluids, which in some embodiments are sodium and salt, may be caused to flow on both sides of the one or more bonded plates through 2D or 3D plate patterns. The 2D or 3D plate patterns can be configured to produce the desired thermal length and pressure drop. As used herein, sodium and salt will be used as exemplary working fluids within the heat exchanger with sodium used as a cooling fluid within the reactor core and salt is used as a heat transfer fluid to transfer thermal energy outside the reactor vessel. In some embodiments, the heat exchanger is used in conjunction with a sodium pool-type nuclear reactor.

According to some embodiments, a sodium inlet 106 is formed adjacent one side of the heat exchanger 100 and a sodium outlet 108 may be formed on an opposing side of the heat exchanger 100. In some embodiments, the sodium inlet 106 may be adjacent a top surface of the heat exchanger 100 and the sodium outlet 108 may be adjacent a bottom surface of the heat exchanger 100 in an installed configuration within a reactor vessel. In some embodiments, the sodium inlet 106 may be higher than the sodium outlet 108. However, in other embodiments, the sodium inlet 106 may be on or adjacent to any side of the heat exchanger 100 and the sodium outlet 108 may be adjacent to or on any other side of the heat exchanger 100. In many instances, the sodium inlet 106 and sodium outlet 108 are on opposing sides of the heat exchanger 100.

A salt inlet 110 may located on or adjacent to one side of the heat exchanger 100, which may be a side orthogonal to the side configured with the sodium inlet 106. A salt outlet 112 may be formed on the same side as the salt inlet 110 to accommodate the salt loop piping that may enter and exit on the same side of the reactor vessel. However, the salt inlet 110 and salt outlet 112 may be formed on different surfaces of the heat exchanger 100. In some cases, the salt inlet 110 and salt outlet 112 may be coaxial and be formed of an inner conduit surrounded by an outer conduit.

The heat exchanger 100 may be formed of a series of parallel plates 102(1), 102(2), 102(n) having surface grooves 114 that are placed adjacent one another so as to form a series of channels when the plates 102 are bonded together. The surface grooves 114 may be photochemically etched, mechanically formed, or formed through some other process, into the surface of the plate and sized and arranged to provide the desired flow characteristics such as fluid path length and pressure drop.

In many cases, the plates 102 are diffusion bonded to one another, which is a solid-state welding process that returns the bonds to the parent metal strength, permits excellent thermal-hydraulic performance, and allows for design optimization of 2D and/or 3D fluid pathways through the heat exchanger 100.

A passthrough 116 for the second fluid may be formed through a plate having channels to guide the first fluid. In some embodiments, a coaxial conduit 118 may be used for the inlet and outlet of the second fluid. In some cases, the inlet and outlet of the second fluid may be formed on a same side of the heat exchanger 100 to simplify piping.

In some embodiments, a header or manifold (not shown) may be attached to the fluid inlet or outlet that provides a fluid communication path through all the layers of the heat exchanger 100 simultaneously. Alternatively, or in addition, ports can be configured during the plate formation stage to provide integral headers in the heat exchanger 100. In some cases, a heat exchanger 100 may be semi-ported with a mixture of headers and ports that are connected by manifolds.

A heat exchanger 100 may be formed of any suitable material and formed of a suitable size for the intended application. In many cases, a heat exchanger 100 may be formed to be substantially smaller than a shell and tube heat exchanger for the same application. In other words, when used within a nuclear reactor vessel, a heat exchanger 100 designed as a sodium/salt heat exchanger may be substantially smaller than a shell and tube heat exchanger configured for sodium/salt heat transfer having similar thermal energy transfer capabilities. In some cases, the heat exchanger 100 requires about seven times less volume than a comparable shell and tube heat exchanger for a similar application.

In the illustrated example, primary sodium flows through open slots from a sodium inlet 106 formed in the upper surface downward through channels formed between plates in the heat exchanger 100 to the sodium outlet 108 formed in the bottom surface of the heat exchanger 100. Salt enters a salt inlet 110 and is distributed to cold channels through distributors and flows upward within channels formed in the heat exchanger 100 and exits a salt outlet 112. A configuration such as this, where hot fluids enter/exit from near the top of the heat exchanger and cold fluids enter/exit near the bottom of the heat exchanger takes advantage of natural convection cycles to encourage efficient fluid flow. For example, a temperature differential of a fluid typically causes the higher temperature fluid to have a lower density than a colder portion of the fluid. Consequently, the heated fluids tend to rise, and the colder fluids will fall due to gravity.

An allowable pressure drop can be specified, and lower pressure drops are typically desirable to reduce operating cost and improve cycle efficiency. In some embodiments, the sodium pressure drop across the heat exchanger 100 is less than about 6 psi, or less than about 5 psi, or less than about 4 psi, or less than about 3 psi. A lower pressure drop may typically require a short flow length and a low viscosity of the coolant, which directly impacts that heat transfer coefficient. The pressure drop can be tuned by varying the flow length, the fluid viscosity, and/or the flow width, and overall heat transfer can likewise be affected by varying the number of layers and the heat transfer area.

The plate surface types can be tailored for the specific purpose and may be formed to enhance surface density and heat transfer coefficients and may be formed as fins having any suitable arrangement, such as serrated, herringbone, or perforated. Of course, other arrangements are possible and contemplated herein. In combination, or in the alternative, passageways may be created directly in the plates through any suitable manner, but in some cases, are formed by photochemical etching.

The passageways may be any suitable size and cross-sectional shape. In some embodiments, the formed channels are semi-circular with a radius of about 0.5 mm, or about 0.75 mm, or about 1 mm. Of course, other suitable cross-sectional shapes and sizes are contemplated in accordance with design flow parameters of the heat exchanger.

FIGS. 2A and 2B illustrate a relative size differential between a sodium/sodium shell and tube heat exchanger 200 (FIG. 2A) and a sodium/salt compact heat exchanger 100 (FIG. 2B). Notably, a sodium/salt shell and tube heat exchanger 200 is significantly larger than the sodium/sodium shell and tube heat exchanger 100 illustrated in FIG. 2A.

FIG. 2A illustrates a schematic view of a nuclear reactor 202 having a shell and tube heat exchanger 200 designed for sodium/sodium heat transfer. As can be seen, the sodium/sodium heat exchanger 200 is one of the largest components within the reactor vessel 204, and is a major design factor in designing the nuclear reactor 202. In fact, the sodium/sodium heat exchanger 200, in large part, determines the height of the reactor vessel 204, which in turn, affects the overall size of the containment structure and other components.

Moreover, shielding the sodium/sodium heat exchanger 200 is difficult and expensive since the sodium/sodium heat exchanger 200 is adjacent to the core 206 where it receives a relatively high neutronic activity. Shielding is difficult due to space constraints within the reactor vessel 204 and due to the size of the heat exchanger 200. When replacing the shell and tube sodium/sodium heat exchanger 200 with a shell and tube sodium/salt heat exchanger, the noted considerations are exacerbated because a sodium/salt shell and tube heat exchanger is significantly larger than the illustrated sodium/sodium shell and tube heat exchanger 200.

In many typical configurations, coolant salt has about a 100x lower thermal conductivity than sodium. Consequently, a sodium/salt shell and tube heat exchanger requires a heat exchanger that is substantially larger than a sodium/sodium heat exchanger. In some instances, a sodium/salt heat exchanger is over twice the height of the sodium/sodium shell and tube heat exchanger 200. In some cases, it may be advantageous to utilize a sodium/salt heat exchanger, where salt is a working fluid such as in an integrated energy system and salt is the thermal energy storage medium. By relying on a sodium/salt heat exchanger, the typical intermediate sodium loop that receives thermal energy from the primary coolant in the reactor vessel 204 and delivers it to a salt loop outside the reactor vessel 204 may be eliminated. However, any gains realized from eliminating the intermediate sodium loop are quickly lost since the reactor vessel 204 must be considerably larger (e.g., of the order of 2× taller) in order to facilitate the sodium/salt shell and tube heat exchanger. Likewise, the containment structure must also be increased in size to accommodate the larger reactor vessel 204.

In some embodiments, the heat exchanger within the reactor vessel 204 plays a prominent role in the size of the reactor vessel 204. By reducing the size of the heat exchanger, the reactor vessel can be reduced in size accordingly. In some embodiments, a compact heat exchanger 100, as substantially described throughout embodiments herein, is used as a primary sodium/salt heat exchanger 100 in the reactor vessel 204.

As can be seen in FIG. 2B, one or more heat exchangers 100 can be located within the reactor vessel 204 at a location that is spaced a distance from the core 206. In some cases, the spacing is significant in terms of radiation exposure. For example, the further from the core 206 the heat exchanger 100 is spaced, the less radiation the heat exchanger 100 is exposed to. Consequently, the further the heat exchanger 100 is placed from the core 206, the less shielding is required in order to reduce salt activation within the salt loop. In addition, a further distance of the heat exchanger 100 from the core 206 improves natural circulation of the sodium within the reactor vessel 204 and the circulation pump 208 may be able to be reduced in size, thus gaining additional efficiencies and size benefits. In some cases, utilizing one or more heat exchangers 100 in the reactor vessel 204 allows a nuclear reactor 202 to output a greater amount of thermal energy, or be reduced in size without sacrificing the amount of thermal energy output.

As compared with the shell and tube heat exchanger 200 from FIG. 2A, in which the heat exchanger is adjacent the core 206 and requires large amounts of shielding in order to reduce activation of the heat transfer fluid, the heat exchanger 100 is small and is spaced further from the core 206, which reduces the amount of shielding required. The heat exchanger 100 thus allows a pool reactor design with significant simplification of design, construction, shielding, piping, and cost required. In some embodiments, the heat exchanger 100 is used with a pool type reactor. In some embodiments, the pool type reactor is a sodium pool type reactor. In some cases, the sodium pool type reactor operates in the fast neutron spectrum.

In some embodiments, the pressure of the salt loop within the heat exchanger 100 is at a higher pressure than the pressure in the sodium loop of the heat exchanger 100. As a consequence, any leaks in the heat exchanger 100 will cause the salt to flow into the sodium. Any potential leaks in the heat exchanger 100 may be detected in the cover gas system of the nuclear reactor 202. The size and location of the heat exchanger 100 facilitates removal and replacement of the heat exchanger 100, thus increasing efficiency in maintenance and replacement of the heat exchanger 100 in comparison with a shell and tube heat exchanger 200.

In some embodiments, multiple heat exchangers can be utilized in a pool type nuclear reactor. As previously described, the sodium inlet may be located at a higher elevation on the heat exchanger 100 with the sodium outlet located at a lower elevation on the heat exchanger 100. A salt inlet and outlet may be located on a same side of the heat exchanger 100, and may be located to facilitate efficiency in installation, piping, and optional replacement of the heat exchanger 100. In some embodiments, the salt inlet and outlet may be provided by a coaxial inlet and outlet pipe. Of course, other configurations are possible, such as separate, non-coaxial pipes, as well as other arrangements of the salt inlet and outlet, which may be located on adjacent, or opposite sides of the heat exchanger 100.

The sodium outlet from two or more heat exchanger's may merge into a single sodium outlet that returns cooled sodium to the core 206. By utilizing salt as the working fluid to receive thermal energy from the nuclear reactor 202 and transfer it to a thermal energy storage system, additional sodium loops are eliminated, which also ameliorates the necessity of large sodium pipes with sodium fire protection and shielding, thus further simplifying construction and associated costs.

While the example heat exchanger 100 has been described with a sodium pool reactor, the features and benefits described herein may be equally applicable to other reactor types. Likewise, while the described cooling media uses salt as an example, this is exemplary and other media and media types are possible.

Figure 3A:
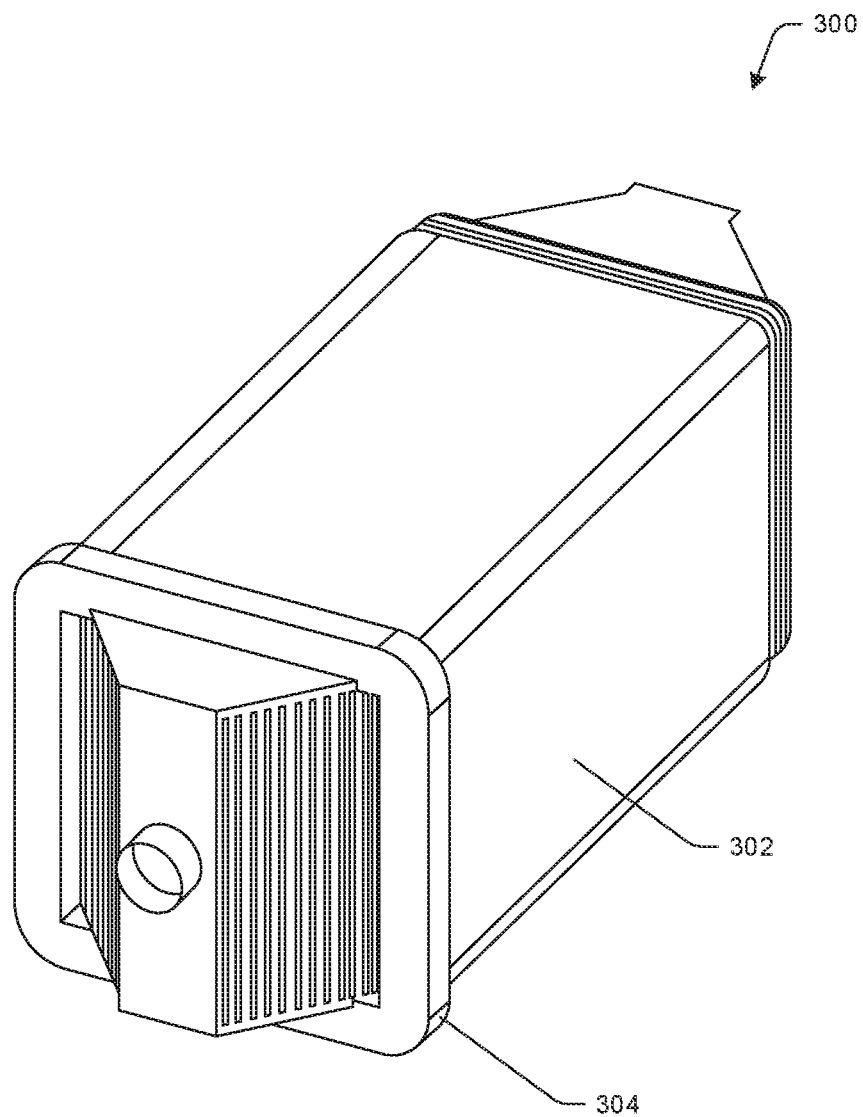
FIG. 3A illustrates a representation of a plate heat exchanger with an in-line configuration, in accordance with some embodiments.
Figure 3B:
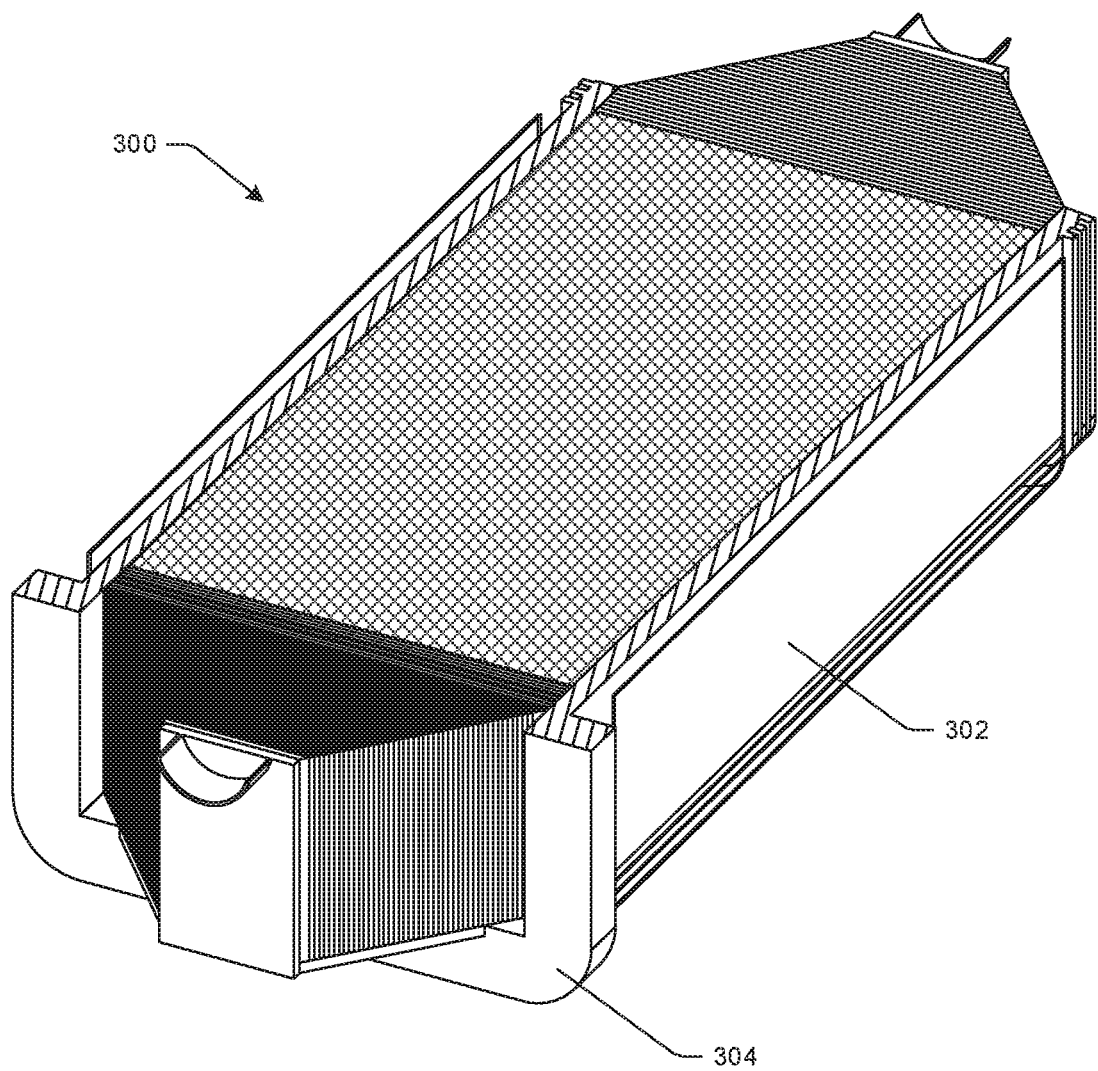
FIG. 3B illustrates a cross-sectional representation of the plate heat exchanger of FIG. 3A, in accordance with some embodiments.

FIG. 3A illustrates a sample heat exchanger 300, and FIG. 3B shows the heat exchanger 300 in cross-section. The heat exchanger 300 includes a housing 302 and may include one or more mounting surfaces 304, such as a flange, which may be used to mount and/or locate the heat exchanger 300. The heat exchanger 300 may include two pairs of inlets/outlets to allow two working fluids to pass through the heat exchanger 300, one fluid receiving thermal energy from the other fluid.

The heat exchanger 300 can be designed and configured to have inlet and outlets at desired locations and orientations. For example, in some cases, two options for delivering a working fluid, such as salt, to the heat exchanger 300 are either in-line or lateral interfaces. For example, an in-line interface, as shown in FIGS. 3A and 3B is one in which the inlet and outlet are located on opposing sides of the heat exchanger, while a lateral interface is one in which the inlet and outlet are not on opposing sides, but rather, may be on orthogonal sides, or the same side.

In some cases, the in-line routing option provides the smallest height/width of the routing options, while potentially adding length. The in-line option may also put interfacing piping directly into the hot and cold sodium flow. An alternative is mixed routing in which one fluid pathway is configured with in-line routing and a second fluid pathway is configured for lateral routing. The fluid pathway routing can be determined as needed based upon the location and orientation within the reactor vessel, along with the connections and piping required.

Figure 4A:
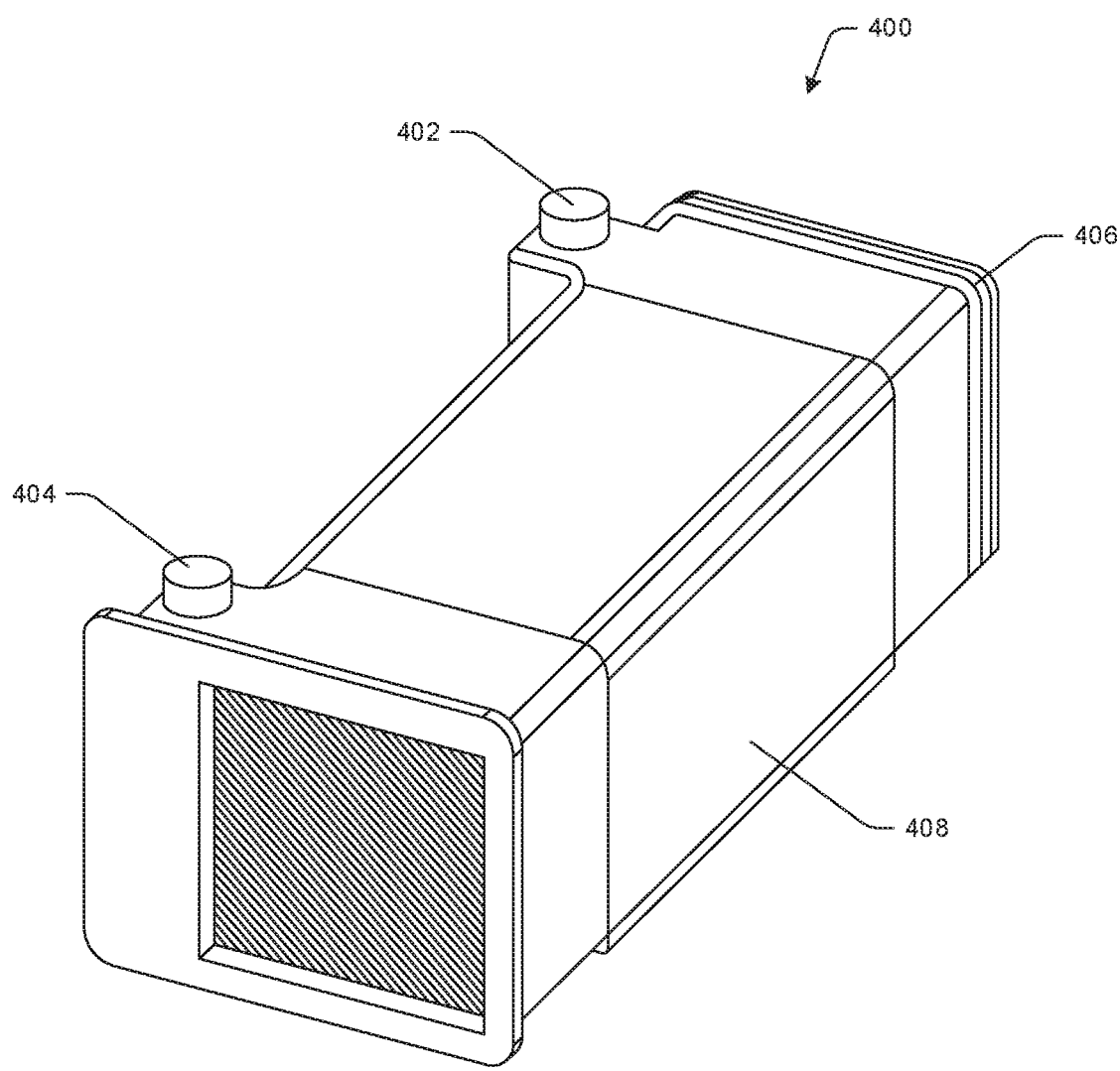
FIG. 4A illustrates a representation of a plate heat exchanger with a lateral configuration, in accordance with some embodiments.
Figure 4B:
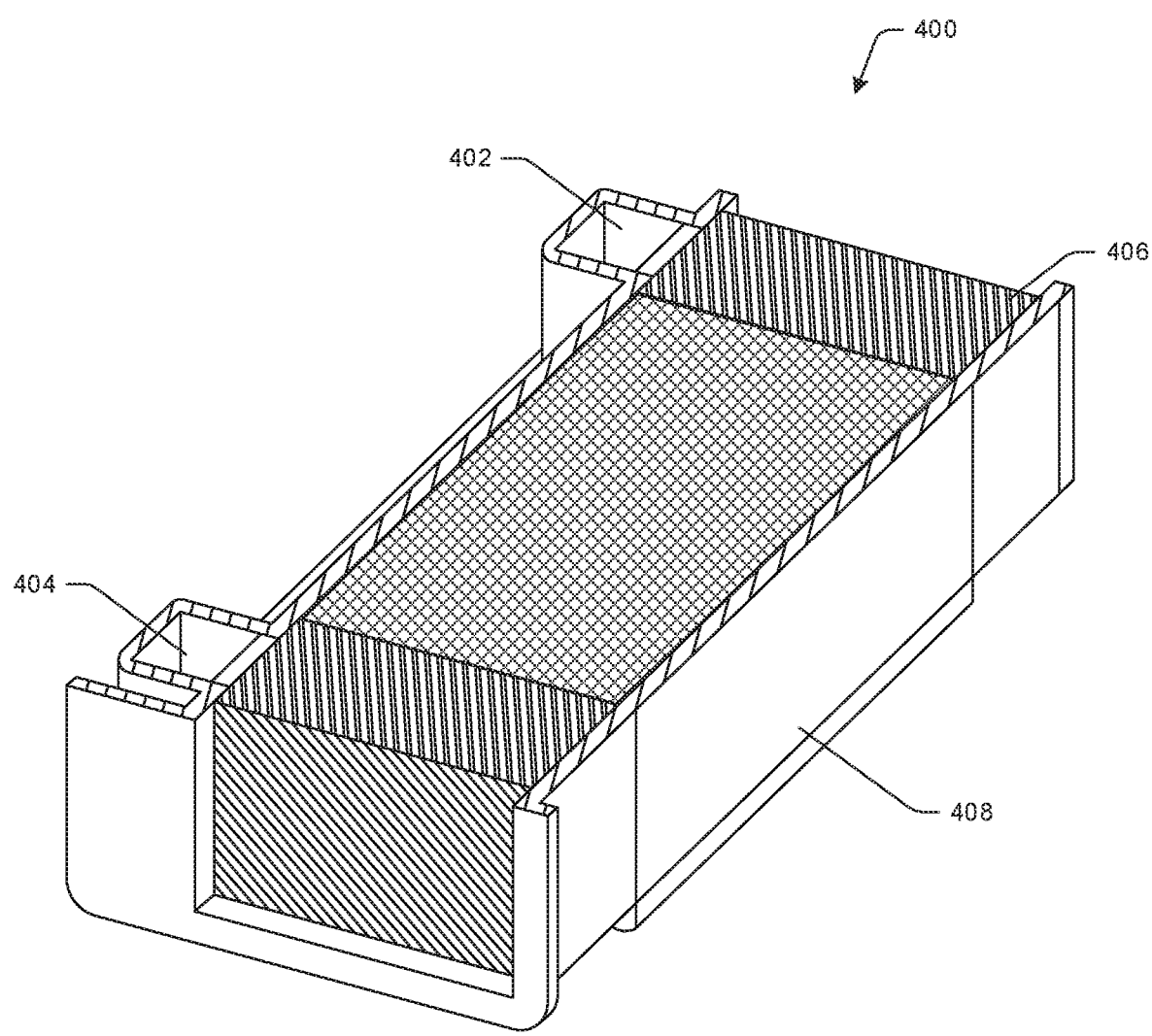
FIG. 4B illustrates a cross-sectional representation of the plate heat exchanger of FIG. 4A, in accordance with some embodiments.

FIGS. 4A and 4B illustrate a sample heat exchanger 400 with lateral fluid routing in which an inlet 402 and outlet 404 are provided on the same side of the heat exchanger 400. In some cases, the heat exchanger 400 cores are sealed in order to inhibit a large leak from the hot pool entering into the cold pool within a sodium pool within the reactor vessel. In some cases, metered leaks between the hot pool and cold pool are designed in the heat exchanger which may simplify the design rather than designing the heat exchanger 400 to prevent all leakage. This may also allow the omission of baffles which are typically used to inhibit leaks within the heat exchanger 400.

In some cases, the heat exchanger 400 experiences a temperature differential between the hot pool at the inlet 402 and the cold pool at the outlet 404 which causes thermal stresses on the heat exchanger 400. The heat exchanger therefore may be designed to account for relative movement of the heat exchanger 400 in axial and perpendicular directions, with the lateral direction being more significant. In some cases, a sliding labyrinth seal 406 is used to permit thermal expansion and contraction of the heat exchanger in a longitudinal direction while maintaining the fluid flow path. Of course, other suitable structure may be provided to permit thermal expansion and contraction while maintaining fluid seals.

In some cases, the sliding labyrinth seals 406 allow a heat exchanger 400 to be inserted into or removed from a fixed space between piping or adjacent heat exchangers 400. In some cases, the sliding labyrinth seal 406 allows the overall length of the heat exchanger 400 to be reduced for inserting into a fixed length location, and then expanded to allow coupling to adjacent structures. Of course, other structures, such as a separate sealing plate may be selectively attached to provide a secure attachment as well as a fluid seal for the heat exchanger 400.

One way of managing the thermal stresses in a heat exchanger 400 is to provide for a thermal sleeve 408 that surrounds at least a portion of the heat exchanger 400 and allow some fluid from the hot pool to leak into the thermal sleeve 408. Allowing some of the hot fluid to enter the thermal sleeve may attenuate the thermal cyclic stresses on the heat exchanger wall.

Figure 5:
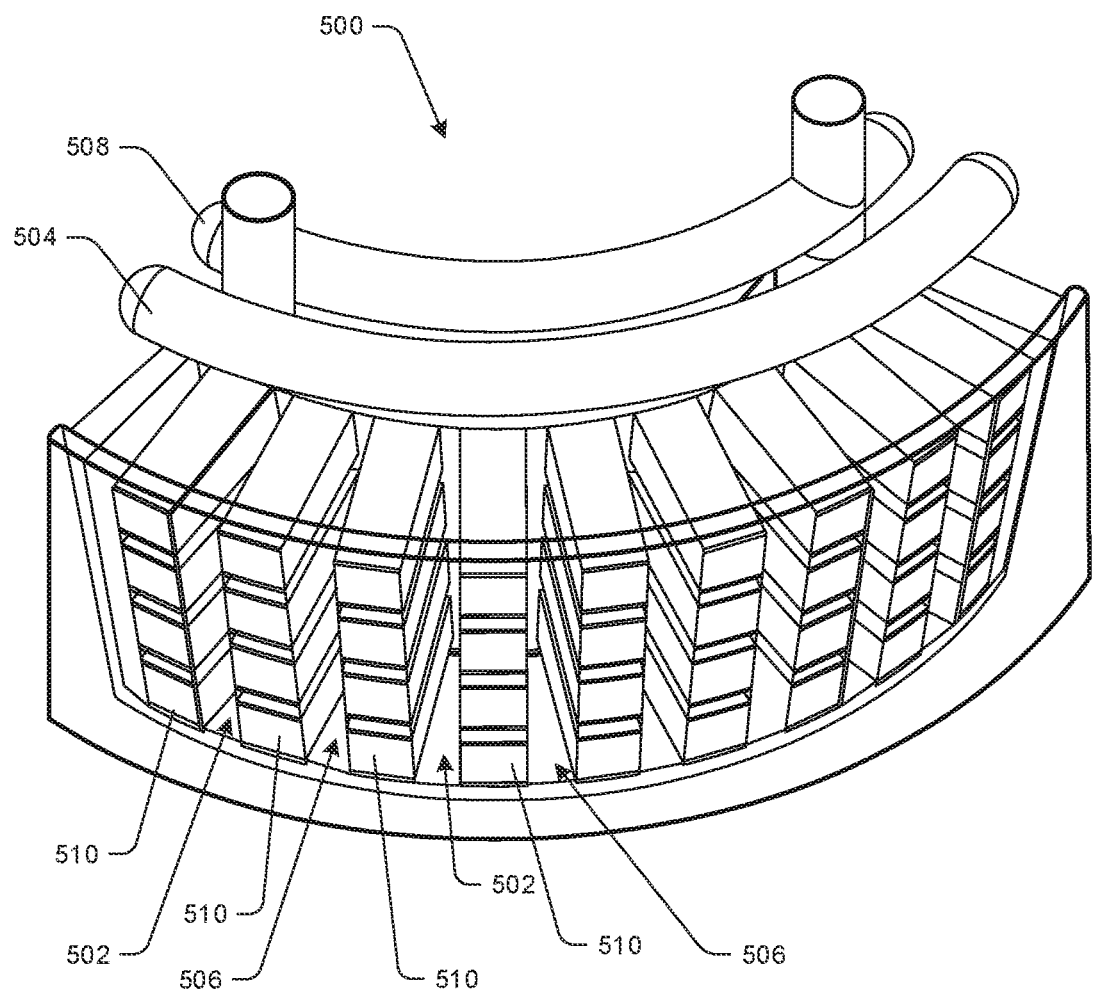
FIG. 5 illustrates an arrangement of heat exchanger cores coupled to a header, in accordance with some embodiments.

FIG. 5 illustrates an arrangement 500 of a heat exchanger cores 510 using alternating hot and cold plena and a header. In some cases, the hot plena 502 are in common fluid communication with a hot header 504. Similarly, cold plena 506 may be in common fluid communication with a cold header 508. The cold header 508 may provide incoming salt where it receives thermal energy from the primary coolant (e.g. sodium) flowing within the plates of the heat exchanger. The hot header 504 may provide a flow path for the hot fluid (e.g., salt) to exit from the hot plena 502.

The heat exchanger cores 510 may be formed of a plurality of bonded plates that each define fluid pathways as described in various embodiments herein. The plates of the heat exchanger cores 510 may provide separation between the alternating hot plena 502 and cold plena 506. As used herein, a grouping of bonded plates, may be referred to as a heat exchanger core 510. In the illustrated example, several heat exchanger cores are used together within a shared heat exchanger body. Any suitable number of heat exchanger cores may be used within a heat exchanger body.

In some embodiments, a plurality of heat exchanger cores are provided to meet the heat duty requirements of the nuclear reactor. The number of heat exchanger cores may be selected based upon the overall heat duty of the nuclear reactor, the designed cyclic thermal stress of the heat exchanger, and the AT of the inlet and outlet fluids. In some cases, 12, 24, 36, 48, 50 or more heat exchanger cores may be provided to handle the heat duty of a nuclear reactor. The heat exchangers may be spaced about the core in any suitable arrangement and may be in fluid communication with one another. In some examples, some of the plurality of heat exchangers are in fluid communication with others of plurality of heat exchangers.

To allow for thermal expansion and contraction of the heat exchanger cores 510 in response to the thermal load, a seal may be provided, such as a welded bellows, or some other expanding seal that permits limited movement of the coupling between adjacent heat exchanger cores or adjacent heat exchangers.

Figure 6:
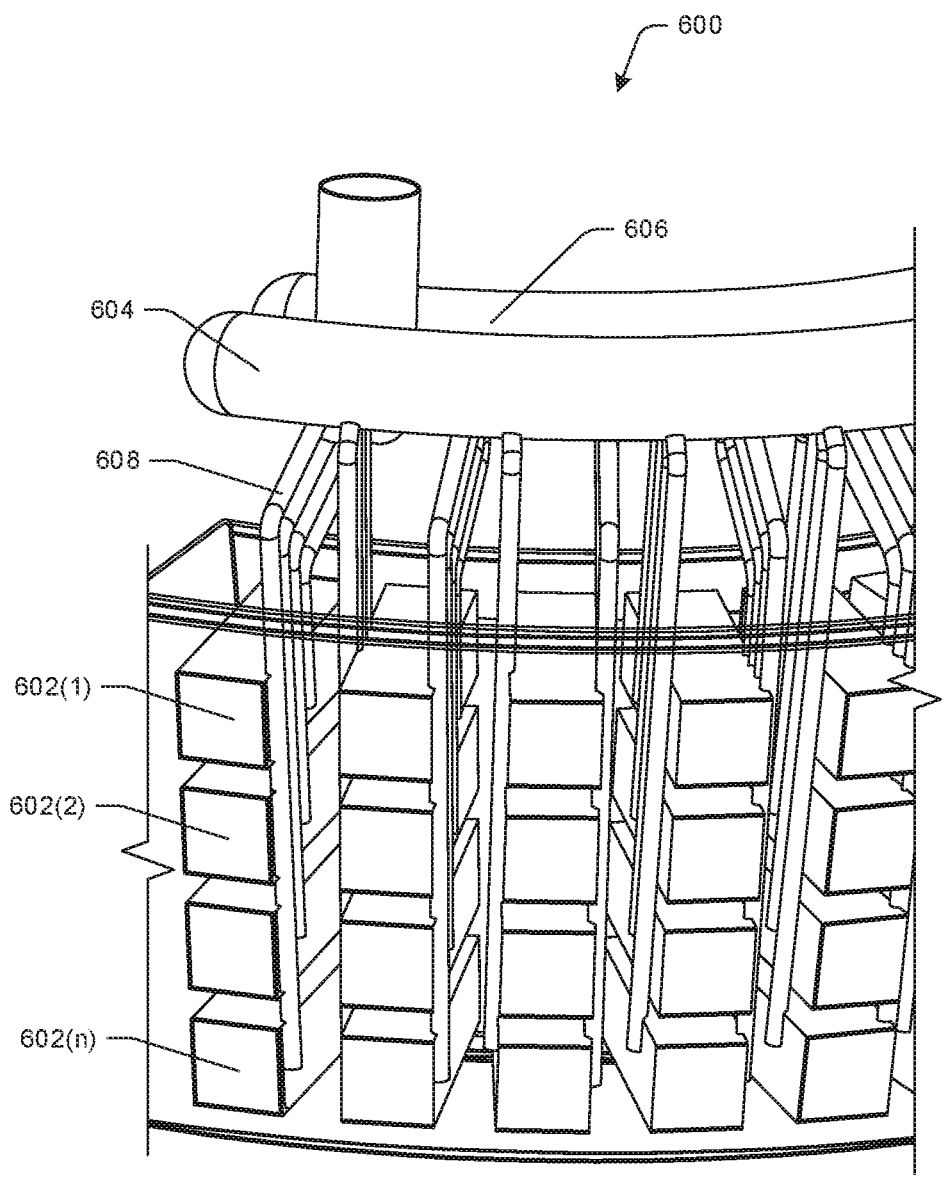
FIG. 6 illustrates an arrangement of heat exchanger cores coupled to a header by piping, in accordance with some embodiments.

FIG. 6 illustrates an arrangement 600 of heat exchanger cores 602(1), 602(2), 602(n) in which a cold header 604 and a hot header 606 are coupled to individual heat exchanger cores 602 by piping 608 providing fluid communication between individual cores 602 and the cold header 604 or hot header 606. The heat exchanger cores 602 may be as substantially described herein with respect to heat exchanger embodiments and may be oriented vertically or horizontally or some other orientation.

In some cases, this arrangement allows individual cores 602 to be installed, removed, and/or replaced efficiently and further allows sufficient space between individual cores 602 to accommodate thermal expansion and contraction. In some cases, the heat exchanger cores 602 are all in communication with a common header 604 in a parallel plumbed configuration, while in other cases, the heat exchanger cores 602 are plumbed in series in which the outlet of a first heat exchanger core may feed to the inlet of a second heat exchanger core. When plumbed in series or parallel, the circuit of heat exchanger cores may each only be responsible for a portion of the total temperature change of the heat exchanger. In some cases, each of the heat exchanger cores 602 may be designed to handle a specified temperature range within the total heat load of the heat exchanger. For example, a first heat exchanger core may be designed to handle a fluid working temperature that is at the thermal boundary of the primary coolant in the nuclear reactor. In other words, a first heat exchanger core may be designed and constructed differently than a second heat exchanger core. The individual cores may utilize different materials, flow path lengths, pressure drops, and/or other characteristics of a heat exchanger core.

Figure 7:
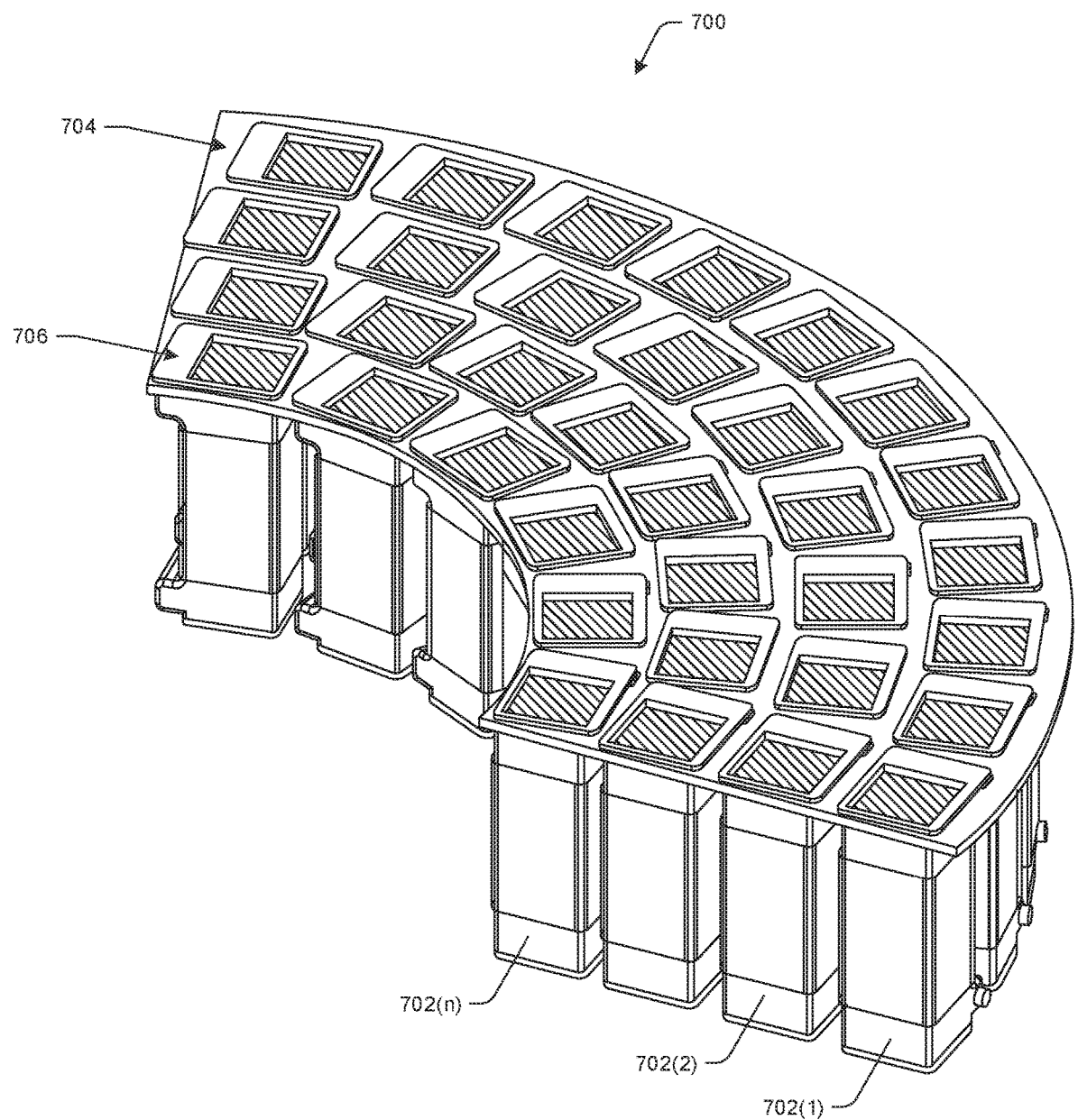
FIG. 7 illustrates a plurality of heat exchanger cores arranged in an arc, in accordance with some embodiments.

FIG. 7 illustrates a stacking arrangement 700 for heat exchanger cores 702(1), 702(2), 702(n). The heat exchanger cores 702 may be as substantially described herein with respect to heat exchanger embodiments. The cores 702 may be oriented vertically, horizontally, or some other orientation. In some cases, the cores 702 may be arranged circumferentially and/or radially about the reactor vessel. In some cases, an outer ring of cores 704 is located closer to a wall of the reactor vessel than an inner ring of cores 706. The spacing between individual cores 702(1) 702(2) may be dependent on the radii and access needs for coolant routing. Any suitable number of heat exchanger cores 702 may be provided and plumbed in any suitable configuration, such as serially, in parallel, or a combination.

Figure 8:
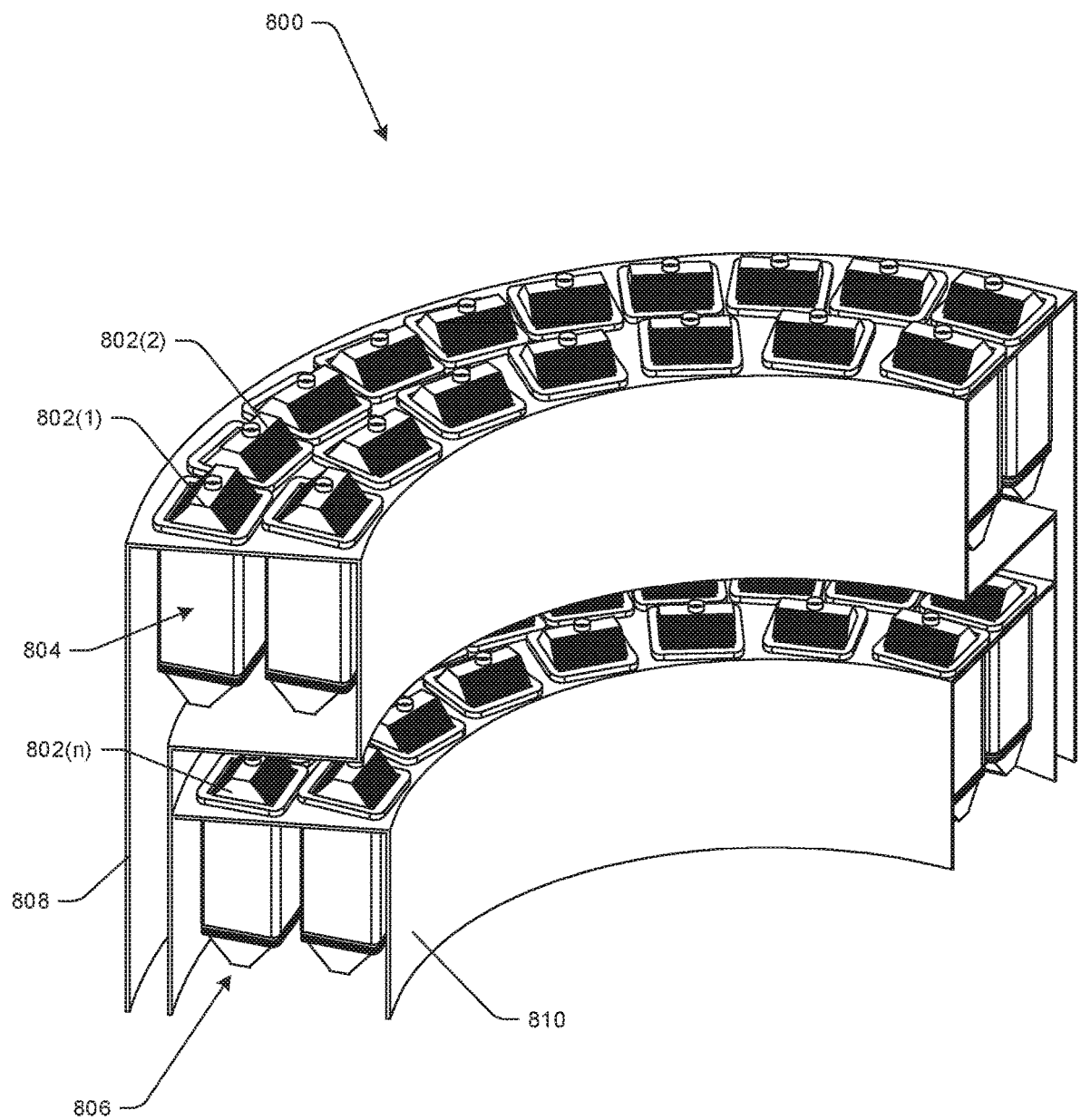
FIG. 8 illustrates a plurality of heat exchanger cores arranged in a stacked arrangement, in accordance with some embodiments.

FIG. 8 illustrates an example stacking arrangement 800 for heat exchanger cores 802(1), 802(2), 802(n). The heat exchanger cores 802 may be as substantially described herein with respect to heat exchanger embodiments and may be oriented horizontally, vertically, or some other orientation. The cores 802 may be arrange circumferentially and/or radially about the reactor vessel. As illustrated, in some cases, two or more cores 802 may be stacked vertically one above another. In some cases, a flow path from the reactor vessel hot pool may enter an upper row 804 of cores 802 and may additionally enter the lower row of cores 806 to define parallel paths and/or multiple inlets from the reactor core hot pool into the cores 802.

As will all example arrangements of multiple heat exchanger cores 802, the individual cores may be plumbed in series, in parallel, or a combination. In the illustrated stacking arrangement 800, a first heat exchanger body 808 may contain an upper row 804 of cores 802 and a second heat exchanger body 810 may contain a lower row 806 of cores 802. Each row may have a separate inlet from the reactor vessel hot pool to allow primary coolant to circulate within the reactor vessel and enter the heat exchangers. The upper row 804 and the lower row 806 may likewise utilize a header (not shown) to direct primary coolant into the cores 802, or may additionally, or alternatively, utilize piping to direct primary coolant into one or more cores 802.

Figure 9:
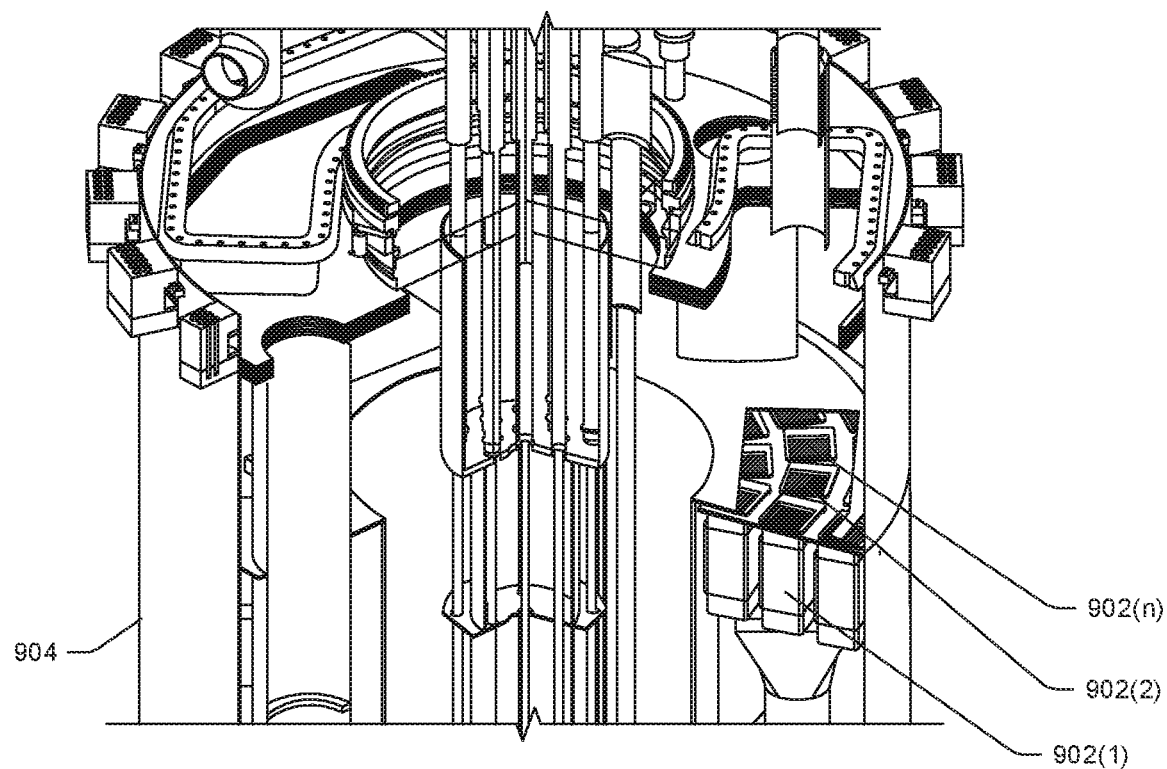
FIG. 9 illustrates a plurality of heat exchanger cores arrange circumferentially about a portion of a reactor vessel, in accordance with some embodiments.

FIG. 9 illustrates an exemplary location of heat exchanger cores 902(1), 902(2), 902(n) arranged circumferentially around the inside of the reactor vessel 904. The cores 902 may be arranged as substantially described herein, and in some cases, are located to be remote from the nuclear reactor core (not shown). The relatively small size of the heat exchanger cores 902 and their proximity to an area of high neutronic activity within the reactor core, allows the heat exchanger cores 902 to avoid much of the neutronic activity, and hence, require much less shielding than if the heat exchangers were significantly larger or defined a coolant flow path closer to the reactor core.

Figure 10:
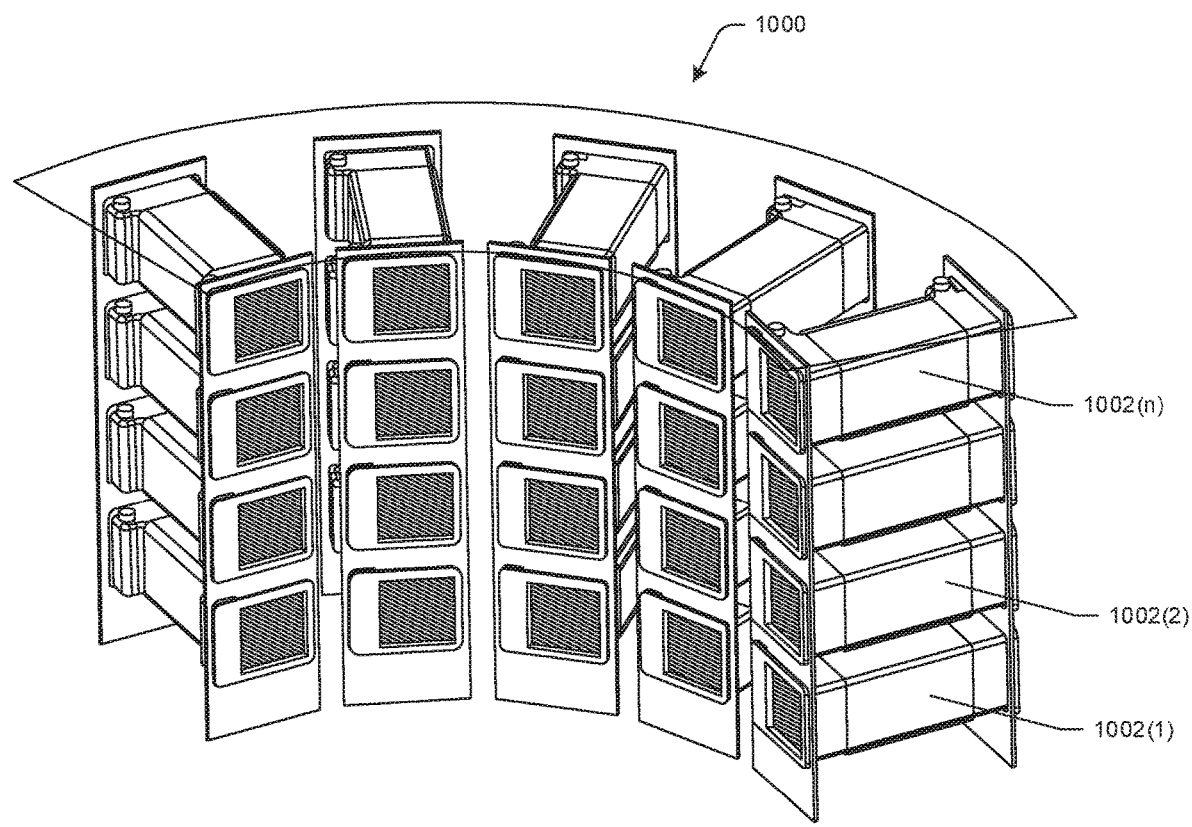
FIG. 10 illustrates a plurality of heat exchanger cores arranged in columns and rows and configured to extend along an inner wall of a reactor vessel, in accordance with some embodiments.

FIG. 10 illustrates an arrangement 1000 of heat exchanger cores 1002(1), 1002(2), 1002(n). The cores 1002 may be substantially as described herein with respect to heat exchanger embodiments. The cores 1002 may be arranged circumferentially about the reactor vessel and may further be stacked in rows. As illustrated, there are four rows of cores 1002 stacked five high for a total of twenty cores 1002. Of course, fewer or a greater number of cores 1002 may be arranged similarly based upon the heat load requirements of the nuclear reactor. Additional cores 1002 may be located in adjacent columns, additional rows, or a separate heat exchanger arrangement 1000 may include any suitable number of rows and/or columns located in a different part of the reactor vessel.

Figure 11:
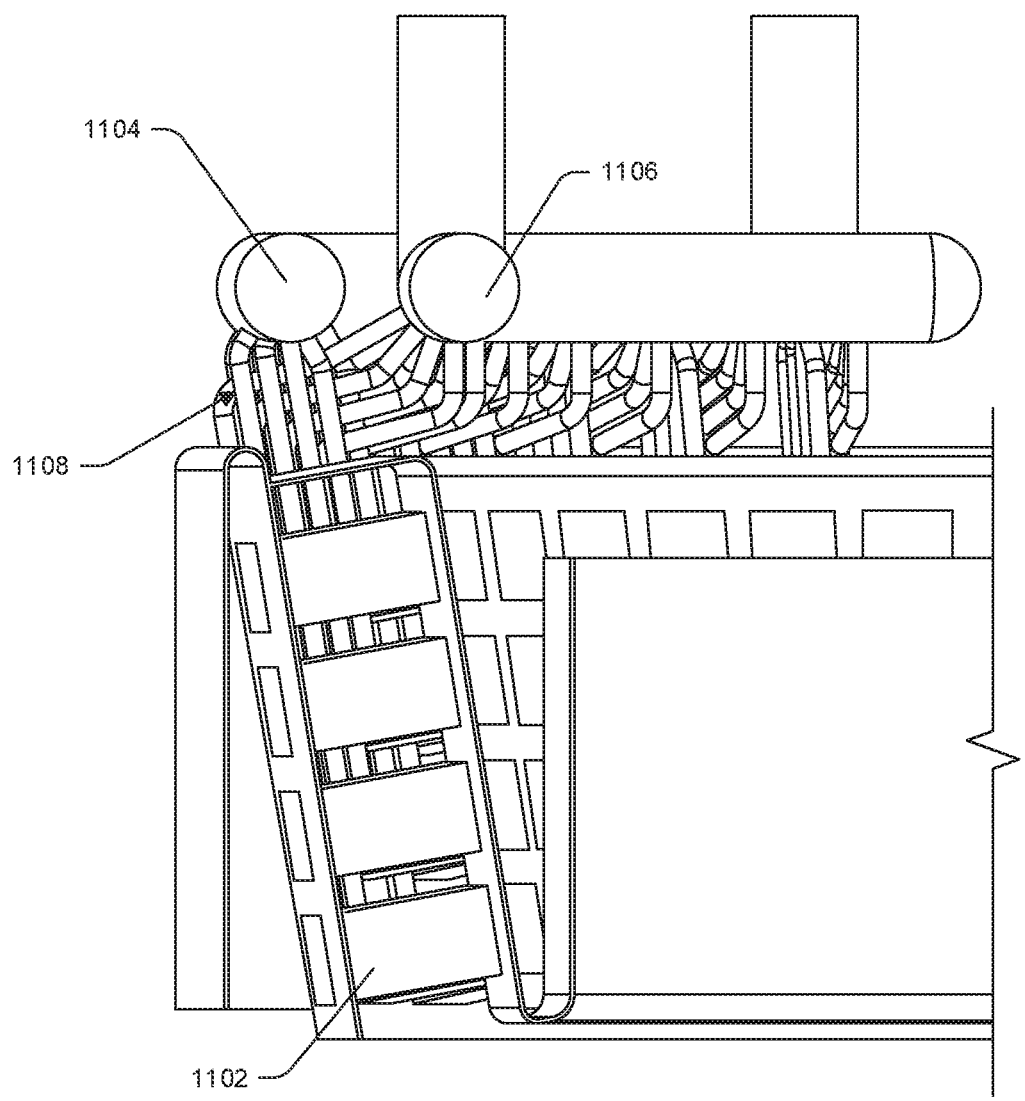
FIG. 11 illustrates a plurality of heat exchanger cores arranged at an angle with respect to vertical, in fluid communication with a header by piping, in accordance with some embodiments.

FIG. 11 illustrates an arrangement 1100 of heat exchanger cores 1102 comprising any suitable number of rows and columns to accommodate the heat load of the nuclear reactor. The heat exchanger cores may be as substantially described herein and may be designed to use any suitable plumbing arrangement, such as the heat exchanger cores 1102 being plumbed in series, in parallel, or a combination. As illustrated, the heat exchanger arrangement 1100 may include a cold header 1104, a hot header 1106, and piping 1108 to define a flow path for fluid to enter and exit the heat exchanger cores 1102. The cores 1102 may be oriented in any suitable orientation, such as horizontal, vertical, or at any suitable angle, as illustrated. In some cases, the outlet of a first heat exchanger core is fluidically coupled to an inlet of a second heat exchanger core, such that the first and second heat exchanger cores are plumbed in series with one another.

The cold header 1104 and the hot header 1106 may be used to create a fluid path for the secondary coolant, which may be salt. In some cases, the cores have individual inlets to allow circulating primary coolant, which may be sodium, to enter into the individual heat exchanger cores.

Figure 12:
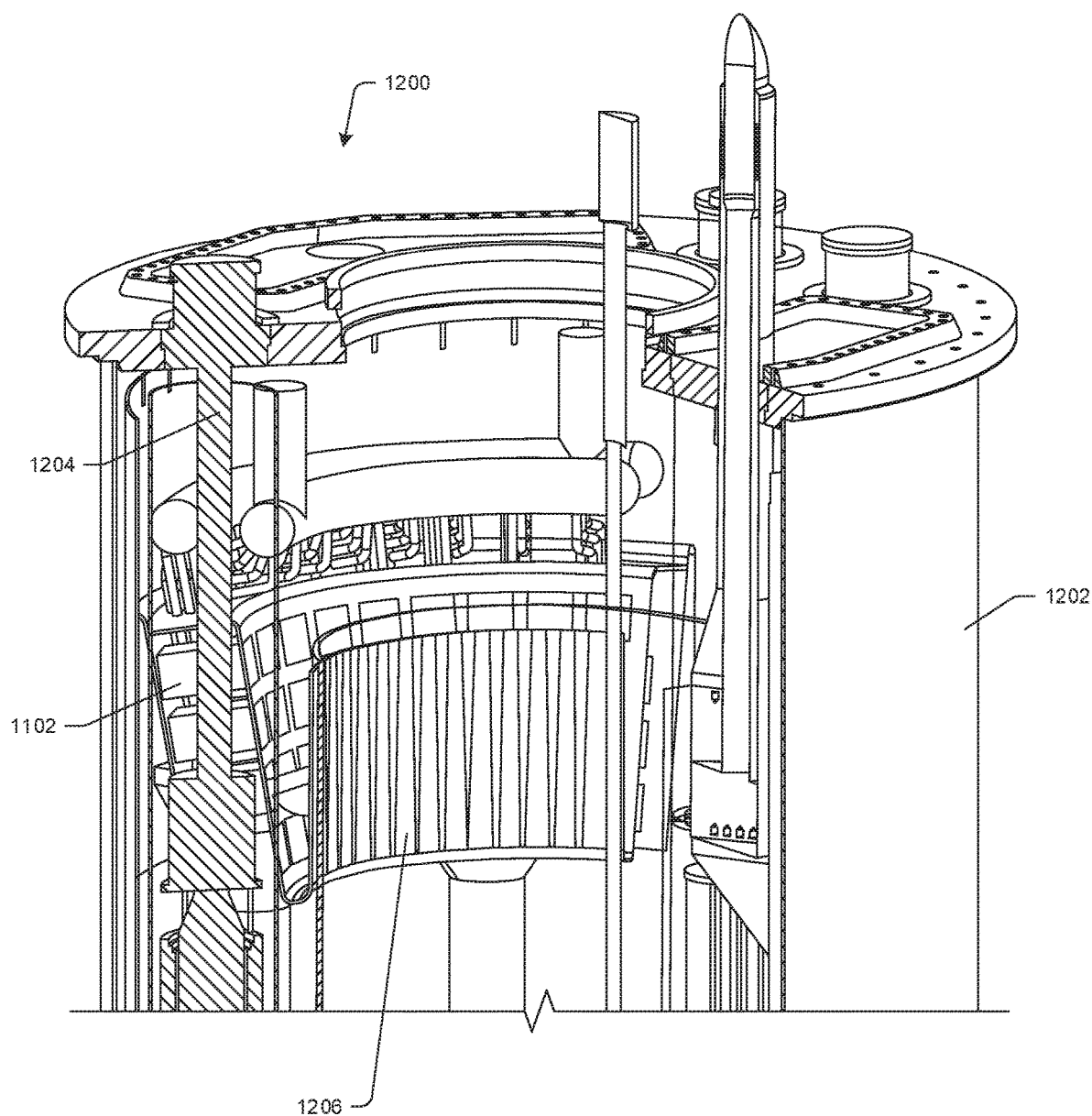
FIG. 12 illustrates an example location of the arrangement of heat exchanger cores within a reactor vessel, in accordance with some embodiments.

FIG. 12 illustrates an example orientation and location for the heat exchanger cores 1102 of FIG. 11. A nuclear reactor 1200 includes a reactor vessel 1202 and one or more pumps 1204. The pumps 1204 may direct primary coolant within the reactor vessel into the heat exchanger cores 1102. In some cases, the pumps 1204 direct primary coolant from the hot pool into the heat exchangers, such as by forcing primary coolant into a plenum in fluid communication with one or more heat exchanger core inlets.

As illustrated, the heat exchanger cores 1102 are positioned near the top of the reactor vessel 1202 which is an area of low neutronic activity. Accordingly, the secondary coolant, which may be salt in some cases, is activated to a much lower extent than typical heat exchangers that define a flow path near the reactor core. Moreover, the compact arrangement of the heat exchanger cores requires much less shielding 1206 to protect the secondary coolant from neutronic activation. Furthermore, in some embodiments, the described heat exchanger cores and their various locations within the reactor vessel allows a sodium to salt heat exchanger that ameliorates issues with salt activation within the reactor vessel.

With the arrangements of heat exchanger cores described herein, the individual cores may be structurally supported separately, which mechanically separates one heat exchanger core from another heat exchanger core and allows the individual cores to distort and expand independently of each other. Thus, the heat exchanger cores handle thermal stresses individually but may remain fluidically coupled together.

Typically, an intermediate loop is provided within an SFR in which the primary sodium transfers thermal energy to an intermediate sodium loop. The intermediate sodium loop then delivers thermal energy to a third loop, which may include water, salt, or some other working fluid. By utilizing the compact heat exchangers shown and described herein, the intermediate loop may be eliminated, thus resulting in a sodium to salt heat exchanger that avoids many of the issues with prior implementations, such as the required size of a sodium/salt heat exchanger and avoiding salt activation.

As with any of the embodiments described herein, the heat exchanger cores may define a third fluid flow path in between the hot and cold flow paths. The third fluid flow path may be used for leak detection and further segregating the primary coolant from the secondary coolant. As the third fluid exits the heat exchanger, it can be tested for inclusion of the primary or secondary coolant materials. For instance, helium can be passed through the third fluid flow path and tested for the presence of the primary or secondary coolant upon its exit.

In some examples, the third fluid flow path may be used to promote oxidation of the hot and cold plates within heat exchanger cores. For instance, an oxidizing fluid, such as $CO_2$, for example, may be passed through the third fluid flow path to cause an oxidation layer to form within the flow channels. An oxidation layer has been shown to inhibit the migration of activation products, such as tritium.

In some cases, an oxidation layer can be formed into the heat exchanger cores during manufacture. For example, when forming the heat exchange core plates, a material may be added to the plates, such as through additive manufacturing, vapor deposition, printing, or some other material addition process, to form an oxidation layer onto the plates before they are bonded together.

Furthermore, the third fluid flow path may be used to attract activation products, such as tritium. As an example, a fluid, such as helium, may be passed through the third fluid path which can capture tritium before its passes to the salt. The tritium may be more attracted to the third fluid than it is attracted to the secondary coolant. The captured tritium can then be removed from the helium. A method may include forming a heat exchanger core with a first fluid flow path, a second fluid flow path, and a third fluid flow path. The method may include passing a third fluid through the third fluid flow path, the third fluid selected to attract activation products, such as tritium. The method may further include recovering the third fluid after it is passed through the heat exchanger core and then sequestering the activation product. In some cases, the method may include passing a fourth fluid through the third fluid flow path, the fourth fluid may be used for another purpose, such as leak detection, creating an oxidation layer, or some other purpose.

This description uses the terms "heat exchanger" and "heat exchanger cores." In some cases, a heat exchanger may be formed of one or more heat exchanger cores. As such, the terms may be used interchangeably as a single core may function as a stand-alone heat exchanger independently of other heat exchanger cores. In some cases, a plurality of heat exchanger cores cooperate and may be referred to in the plural as a heat exchanger.

The disclosure sets forth example embodiments and, as such, is not intended to limit the scope of embodiments of the disclosure and the appended claims in any way. Embodiments have been described above with the aid of functional building blocks illustrating the implementation of specified components, functions, and relationships thereof. The boundaries of these functional building blocks have been arbitrarily defined herein for the convenience of the description. Alternate boundaries can be defined to the extent that the specified functions and relationships thereof are appropriately performed.

The foregoing description of specific embodiments will so fully reveal the general nature of embodiments of the disclosure that others can, by applying knowledge of those of ordinary skill in the art, readily modify and/or adapt for various applications such specific embodiments, without undue experimentation, without departing from the general concept of embodiments of the disclosure. Therefore, such adaptation and modifications are intended to be within the meaning and range of equivalents of the disclosed embodiments, based on the teaching and guidance presented herein. The phraseology or terminology herein is for the purpose of description and not of limitation, such that the terminology or phraseology of the specification is to be interpreted by persons of ordinary skill in the relevant art in light of the teachings and guidance presented herein.

The breadth and scope of embodiments of the disclosure should not be limited by any of the above-described example embodiments, but should be defined only in accordance with the following claims and their equivalents.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

It is, of course, not possible to describe every conceivable combination of elements and/or methods for purposes of describing the various features of the disclosure, but those of ordinary skill in the art recognize that many further combinations and permutations of the disclosed features are possible. Accordingly, various modifications may be made to the disclosure without departing from the scope or spirit thereof. Further, other embodiments of the disclosure may be apparent from consideration of the specification and annexed drawings, and practice of disclosed embodiments as presented herein. Examples put forward in the specification and annexed drawings should be considered, in all respects, as illustrative and not restrictive. Although specific terms are employed herein, they are used in a generic and descriptive sense only, and not used for purposes of limitation.

Unless otherwise noted, the terms "connected to," "coupled to", "in fluid communication" (and their derivatives), as used in the specification, are to be construed as permitting both direct and indirect (i.e., via other elements or components) connection. In addition, the terms "a" or "an," as used in the specification, are to be construed as meaning "at least one of." Finally, for ease of use, the terms "including" and "having" (and their derivatives), as used in the specification, are interchangeable with and have the same meaning as the word "comprising."

From the foregoing, and the accompanying drawings, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a particular configuration, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A plate heat exchanger for a nuclear reactor, comprising:
  a plurality of plates encased within an enclosure to inhibit a leak within the heat exchanger from escaping to a location outside the enclosure, the plurality of plates and the enclosure together forming a heat exchanger core having a longitudinal axis;
  a first fluid inlet plenum and a first fluid outlet plenum and a first fluid pathway communicating therebetween, the first fluid pathway formed as guide channels in each of the plurality of plates, wherein the first fluid inlet plenum is in fluid communication with each of the guide channels and the first fluid outlet plenum is in fluid communication with each of the guide channels;
  a second fluid inlet plenum and a second fluid outlet plenum and a second fluid pathway communicating therebetween, the second fluid pathway formed as second guide channels in each of the plurality of plates and the second fluid inlet plenum and the second fluid outlet plenum are in fluid communication with each of the second guide channels, the second fluid pathway fluidically separated from the first fluid pathway;
  a sliding labyrinth seal coupled to the plate exchanger, the sliding labyrinth seal configured to allow the plate heat exchanger to be reduced in length along the longitudinal axis in order to install the plate heat exchanger into a fixed space that is shorter in length than an overall length of the plate heat exchanger when fully expanded;
  a first fluid inlet pipe coupled to the first fluid inlet plenum;
  a first fluid outlet pipe coupled to the first fluid outlet plenum;
  a second fluid inlet pipe coupled to the second fluid inlet plenum; and
  a second fluid outlet pipe coupled to the second fluid outlet plenum.

2. The plate heat exchanger as in claim 1, further comprising a third fluid inlet and a third fluid outlet and a third fluid pathway communicating therebetween, the third fluid pathway fluidically separated from the first fluid pathway and the second fluid pathway, wherein the third fluid pathway is configured for a purpose other than thermal energy transfer.

3. The plate heat exchanger as in claim 2, wherein third fluid pathway is configured to receive a third fluid, different from a first fluid and a second fluid.

4. The plate heat exchanger as in claim 3, wherein the third fluid is selected for leak detection of the first fluid, the second fluid, or both.

5. The plate heat exchanger as in claim 3, wherein the third fluid is selected to create an oxidation layer within the third fluid pathway.

6. The plate heat exchanger as in claim 3, wherein the third fluid is selected to capture fission products or activation products.

7. The plate heat exchanger as in claim 6, wherein the third fluid is selected to capture tritium.

8. The plate heat exchanger as in claim 3, wherein the third fluid is hydrogen, helium, or $CO_2$.

9. The plate heat exchanger as in claim 1, wherein the first fluid inlet plenum and the first fluid outlet plenum are formed on a same side of the plate heat exchanger.

10. The plate heat exchanger as in claim 9, wherein the first fluid inlet pipe and the first fluid outlet pipe comprise a coaxial conduit coupled to the first fluid inlet plenum and the first fluid outlet plenum, the coaxial conduit defining an inner fluid conduit and an outer fluid conduit, the inner fluid conduit fluidically coupled to one of the first fluid inlet plenum and the first fluid outlet plenum and the outer fluid conduit fluidically coupled to the other of the first fluid inlet plenum and the first fluid outlet plenum.

11. The plate heat exchanger as in claim 1, further comprising a first fluid in the first fluid pathway and a second fluid in the second fluid pathway, the second fluid different from the first fluid.

12. The plate heat exchanger as in claim 11, wherein the first fluid is sodium.

13. The plate heat exchanger as in claim 11, wherein the second fluid is a molten salt.

14. The plate heat exchanger as in claim 1, wherein the plate heat exchanger is a first plate heat exchanger and further comprising a second plate heat exchanger fluidically coupled to the first plate heat exchanger, each of the first plate heat exchanger first fluid inlet plenum and the second plate heat exchanger first fluid inlet plenum fluidically coupled to a fluid header.

15. The plate heat exchanger as in claim 1, wherein the plate heat exchanger is a first plate heat exchanger and further comprising a second plate heat exchanger having the first fluid outlet plenum of the first plate heat exchanger in fluid communication with the first fluid inlet plenum of the second plate heat exchanger.

16. The plate heat exchanger as in claim 1, wherein the plate heat exchanger is a first plate heat exchanger and further comprising a plurality of heat exchangers configured to cooperate to handle a heat load of a nuclear reactor.

17. The plate heat exchanger as in claim 16, wherein at least some of the plurality of heat exchangers are in fluid communication by a fluid header.

18. The plate heat exchanger as in claim 16, wherein at least some of the plurality of heat exchangers are plumbed in series.

19. The plate heat exchanger as in claim 16, wherein at least some of the plurality of heat exchangers are plumbed in parallel.

20. The plate heat exchanger as in claim 1, further comprising a thermal sleeve coupled to and surrounding at least a portion of the enclosure, the thermal sleeve configured to allow hot fluid from a hot pool within a reactor vessel in which the plate heat exchanger is submerged, to flow into a space between an interior portion of the thermal sleeve and an outer surface of the enclosure to maintain the hot fluid in thermal contact with the outer surface of the enclosure to attenuate thermal cyclic stresses on the heat exchanger.

* * * * *